(12) United States Patent
Kay et al.

(10) Patent No.: US 10,727,949 B2
(45) Date of Patent: Jul. 28, 2020

(54) SYSTEMS AND METHODS FOR HIGH-ALTITUDE RADIO/OPTICAL HYBRID PLATFORM

(71) Applicant: Hughes Network Systems, LLC, Germantown, MD (US)

(72) Inventors: Stanley Edward Kay, Rockville, MD (US); Neal David Becker, Olney, MD (US); Lin-Nan Lee, Potomac, MD (US)

(73) Assignee: Hughes Network Systems, LLC., Germantown, MD (US)

( * ) Notice: Subject to any disclaimer, the term of this patent is extended or adjusted under 35 U.S.C. 154(b) by 0 days.

(21) Appl. No.: 16/237,358

(22) Filed: Dec. 31, 2018

(65) Prior Publication Data

US 2020/0119811 A1 Apr. 16, 2020

Related U.S. Application Data

(60) Provisional application No. 62/745,254, filed on Oct. 12, 2018.

(51) Int. Cl.
*H04B 10/29* (2013.01)
*H04B 7/185* (2006.01)
(Continued)

(52) U.S. Cl.
CPC .......... *H04B 10/29* (2013.01); *H04B 7/1858* (2013.01); *H04B 7/18504* (2013.01);
(Continued)

(58) Field of Classification Search
None
See application file for complete search history.

(56) References Cited

U.S. PATENT DOCUMENTS 6,327,063 B1 12/2001 Rockwell
9,723,386 B1 8/2017 Ni et al.
(Continued)

FOREIGN PATENT DOCUMENTS

| CN | 104639642 B | 8/2018 |
|----|-------------|--------|
| EP | 1351413 B1 | 3/2003 |
| EP | 3200358 A1 | 8/2017 |

OTHER PUBLICATIONS

Do, Xuan Phong, "A Feasibility Study for Laser Communications between Micro Satellites and GEO Satellites", 2015.
(Continued)

*Primary Examiner* — David W Lambert
(74) *Attorney, Agent, or Firm* — NovoTechIP International PLLC

(57) ABSTRACT

Techniques for data transmission including receiving, at a geostationary earth orbiting satellite, forward-direction user data via a forward optical link; transmitting, by the geostationary earth orbiting satellite via multiple radio frequency (RF) spot beams, the forward-direction user data received via the forward optical link; receiving, at a stratospheric high-altitude communication device, forward-direction user data via multiple concurrent forward RF feeder links; transmitting, by the stratospheric high-altitude communication device via the forward optical link, the forward-direction user data received via the forward RF feeder links; transmitting, by each of multiple ground-based feeder RF terminals at a same RF feeder site, a respective one of the forward RF feeder links. At least 95% of forward feeder data throughput for all of the forward RF service link transmissions by the satellite is carried via the forward optical link and the forward RF feeder links.

23 Claims, 15 Drawing Sheets

(51) Int. Cl.
*H04J 14/02* (2006.01)
*H04B 7/204* (2006.01)
*H04B 10/118* (2013.01)
*H04B 10/50* (2013.01)
*H04B 7/19* (2006.01)

(52) U.S. Cl.
CPC ........... *H04B 7/18513* (2013.01); *H04B 7/19* (2013.01); *H04B 7/2041* (2013.01); *H04B 10/118* (2013.01); *H04B 10/503* (2013.01); *H04J 14/02* (2013.01)

(56) References Cited

U.S. PATENT DOCUMENTS

| | | | |
|---|---|---|---|
| 2003/0213872 | A1 | 11/2003 | Lloyd |
| 2005/0249501 | A1 | 11/2005 | Wolcott et al. |
| 2013/0177321 | A1 | 7/2013 | DeVaul et al. |
| 2013/0177322 | A1 | 7/2013 | DeVaul et al. |
| 2013/0179008 | A1 | 7/2013 | DeVaul et al. |
| 2014/0085135 | A1 | 3/2014 | DeVaul et al. |
| 2014/0341586 | A1 | 11/2014 | Wyler et al. |
| 2015/0063159 | A1 | 3/2015 | Bonawitz et al. |
| 2015/0244458 | A1 | 8/2015 | Erkmen et al. |
| 2015/0270890 | A1 | 9/2015 | Vasavada et al. |
| 2015/0271730 | A1 | 9/2015 | Benammar et al. |
| 2015/0318916 | A1 | 11/2015 | Gopal et al. |
| 2016/0037434 | A1 | 2/2016 | Gopal et al. |
| 2016/0105806 | A1 | 4/2016 | Noerpel et al. |
| 2016/0204865 | A1 | 7/2016 | Boroson et al. |
| 2016/0211908 | A1 | 7/2016 | Noerpel et al. |
| 2017/0085411 | A1 | 3/2017 | Noerpel et al. |
| 2017/0214462 | A1* | 7/2017 | Busche .............. H04B 7/18504 |
| 2017/0272131 | A1 | 9/2017 | Ananth et al. |
| 2017/0294957 | A1 | 10/2017 | Ravishankar et al. |
| 2018/0019816 | A1 | 1/2018 | Wang et al. |
| 2018/0074208 | A1 | 3/2018 | Ravishankar et al. |
| 2018/0084476 | A1 | 3/2018 | Kay et al. |
| 2018/0098247 | A1 | 4/2018 | Gopal et al. |
| 2018/0160373 | A1 | 6/2018 | Ravishankar et al. |
| 2018/0191431 | A1 | 7/2018 | Moision et al. |
| 2018/0192298 | A1 | 7/2018 | Noerpel et al. |
| 2018/0234284 | A1 | 8/2018 | Noerpel et al. |
| 2019/0028197 | A1* | 1/2019 | Turner ................. H04B 10/118 |

OTHER PUBLICATIONS

Giggenbach, Roy et al., "Optical Satellite Downlinks to Optical Ground Stations and High Altitude Platforms", Advance-in Mobile and Wireless Communications: Views of the 16th IST Mobile and Wireless Communications Summit, 2008.

Giggenbach, Roy, "Optical Free Space Links for Satellite-Ground Communications", Tutorial held at ASMS/SPSC, Livorno, 2014.

Kolev, Dimitar et al., "Transmission analysis for OFDM signals over hybrid RF-optical high-throughput satellite", Optics Express, vol. 26, No. 4, Feb. 19, 2018.

Perlot, Nicholas et al., "System Requirements for Optical HAP-Satellite Links", 6th International Symposium on Communication Systems, Networks and Digital Signal Processing, 2008.

Roy, Bernard et al., "Optical Feeder links for High Throughput Satellites", 2015 IEEE International Conference on Space Optical Systems and Applications.

Toyoshima, Morio, "Trends in satellite communications and the role of optical free-space communications", Journal of Optical Networking, vol. 4, Issue 6, pp. 300-311 (2005).

Farserotu J et al: "Scalable, Hybrid Optical-RF Wireless Communication System for Broadband and Multimedia Service to Fixed and Mobile Users", Wireless Personal Communications, Springer, Dordrecht, NL, vol. 24, No. 2, Jan. 1, 2003 (Jan. 1, 2003), pp. 327-339, XP001144461, ISSN: 0929-6212, DOI: 10.1023/A:1022554908296.

International Search Report and Written Opinion dated Jan. 22, 2020 by the International Searching Authority (European Patent Office) in PCT Application PCT/US2019/056320.

* cited by examiner

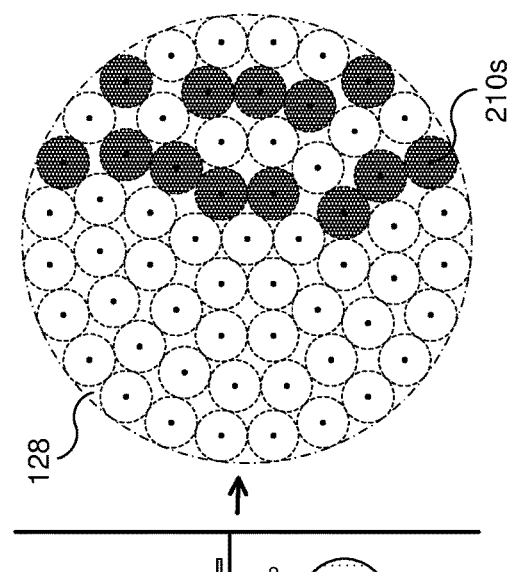
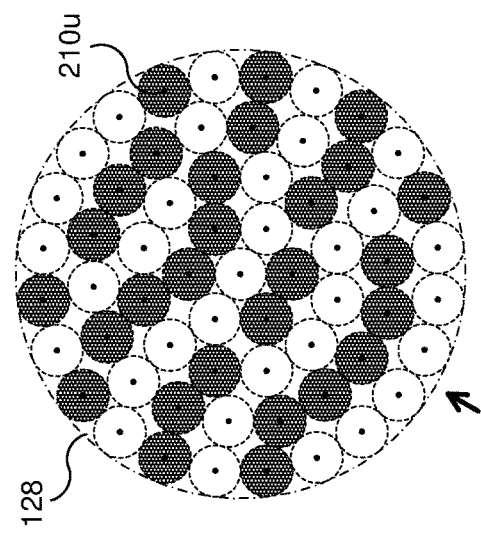
FIG. 11A   FIG. 11B
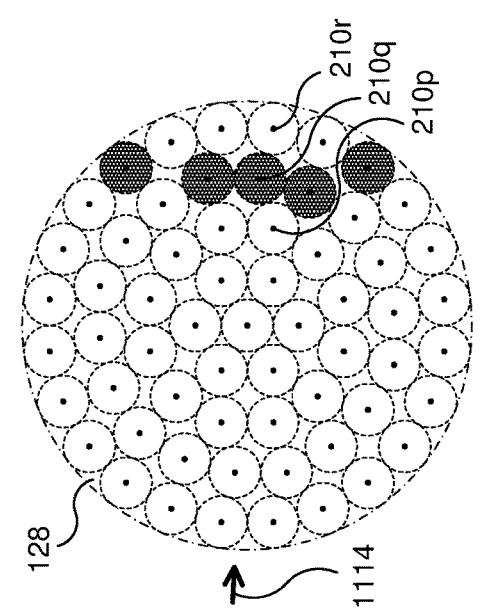
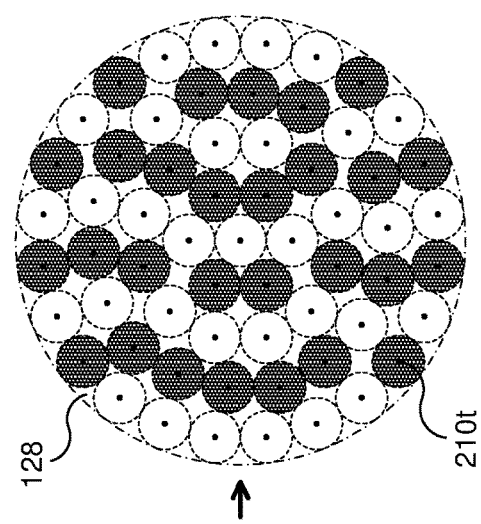
FIG. 11C   FIG. 11D

SYSTEMS AND METHODS FOR HIGH-ALTITUDE RADIO/OPTICAL HYBRID PLATFORM

CROSS-REFERENCE TO RELATED APPLICATIONS

This application claims a benefit of priority to U.S. Provisional Patent Application No. 62/745,254, filed on Oct. 12, 2018 (entitled "High Altitude Radio/Optical Hybrid Platform and Diversity Optical Link Platform"), which is incorporated by reference herein in its entirety.

BACKGROUND

Individual high-throughput satellites in geosynchronous earth orbit (GEO) over time offer increasing aggregate end-user data throughput. For example, the EchoStar 19 satellite, launched in 2016, offers a data throughput in excess of 200 gigabits per second (Gbps). One limit to achieving terabit per second (Tbps) forward data throughput (also referred to as "data capacity" or "capacity") from a single GEO satellite is available forward feeder link bandwidth for delivering data to the satellite. With radio frequency (RF) communications, including various "millimeter wave" bands, such rates are generally impractical and expensive. RF feeder links must comply with regulatory constraints and also not conflict with user RF links (the co-siting problem), which makes the following RF bands undesirable:

- 27.5-28.35 GHz has geographical limitations due to conflicts with 5G cellular communications technology efforts.
- 28.6-29.1 GHz is utilized by NGSO (non-geostationary orbit) communication satellites, placing the band at risk from various LEO satellite constellation plans.
- License-exempt V-band (50-75 GHz) guarantees 4 GHz of bandwidth, with a likely additional 2 GHz, another 2 GHz hopeful, and another 2 GHz in the distant future.

Plus, at this time, the W-band (75-110 GHz), although it offers 10 GHz, requires further technical development for this purpose for use in GEO RF feeder links. Additionally, even with a spectral efficiency of 2.5 bps/Hz, 400 GHz of total RF bandwidth is required to reach 1 Tbps data capacity, so combined use of the available bands would require about 19 gateways (GWs), plus many additional gateways for diversity. For GEO satellites with data throughput in only a few hundreds of gigabits per second, ground segment costs (construction, operation, and maintenance) for feeder links are already a significant percentage of overall network system cost. For 1 Tbps or greater data throughput, and the resulting increase in the number of gateways, ground segment costs become even more significant. Also, although it may be possible to fit the needed number of gateways in the United States, a very favorable satellite location would still be needed. Thus, in view of significant technology challenges and regulatory uncertainty, use of RF feeders between the Earth's surface and a GEO satellite to achieve terabit per second or higher data throughput is a difficult, uncertain, and expensive architecture.

BRIEF DESCRIPTION OF THE DRAWINGS

The drawing figures depict one or more implementations in accord with the present teachings, by way of example only, not by way of limitation. In the figures, like reference numerals refer to the same or similar elements.

In FIG. 8, a first HAP payload and a second HAP payload are operating at approximately a first altitude in proximity to the feeder RFT array at respective zenith distances relative to the feeder RFT array. FIG. 9 illustrates an example in which a handover operation is performed from the first HAP payload to the second HAP payload. FIG. 10 illustrates an example arrangement of a fleet of three HAP payloads after the handover described in FIG. 9. FIG. 10 illustrates an example arrangement of the fleet of three HAP payloads after FIG. 9.

FIGS. 11A-D illustrate examples in which RF feeder links are operated with degradation in capacity in accordance with a zenith distance and azimuth of a HAP relative to a feeder RFT array. In FIG. 11A, the HAP is at a zenith distance similar to the zenith distance shown for the first HAP payload in FIG. 8. In FIG. 11B, the HAP has moved to a position with an increased zenith distance, and in response a total of 13 of the feeder RFTs have been disabled. In FIG. 11C, the HAP has advanced to another position to a further increased zenith distance, and in response a total of 28 of the feeder RFTs have been disabled. In FIG. 11D, the HAP as advanced to another position, with a zenith distance similar to the zenith distance in FIG. 11C, but at a much different azimuth.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings. To more clearly describe the disclosed subject matter, various features illustrated in the figures are not illustrated to scale, including distances or angles.

Figure 1:
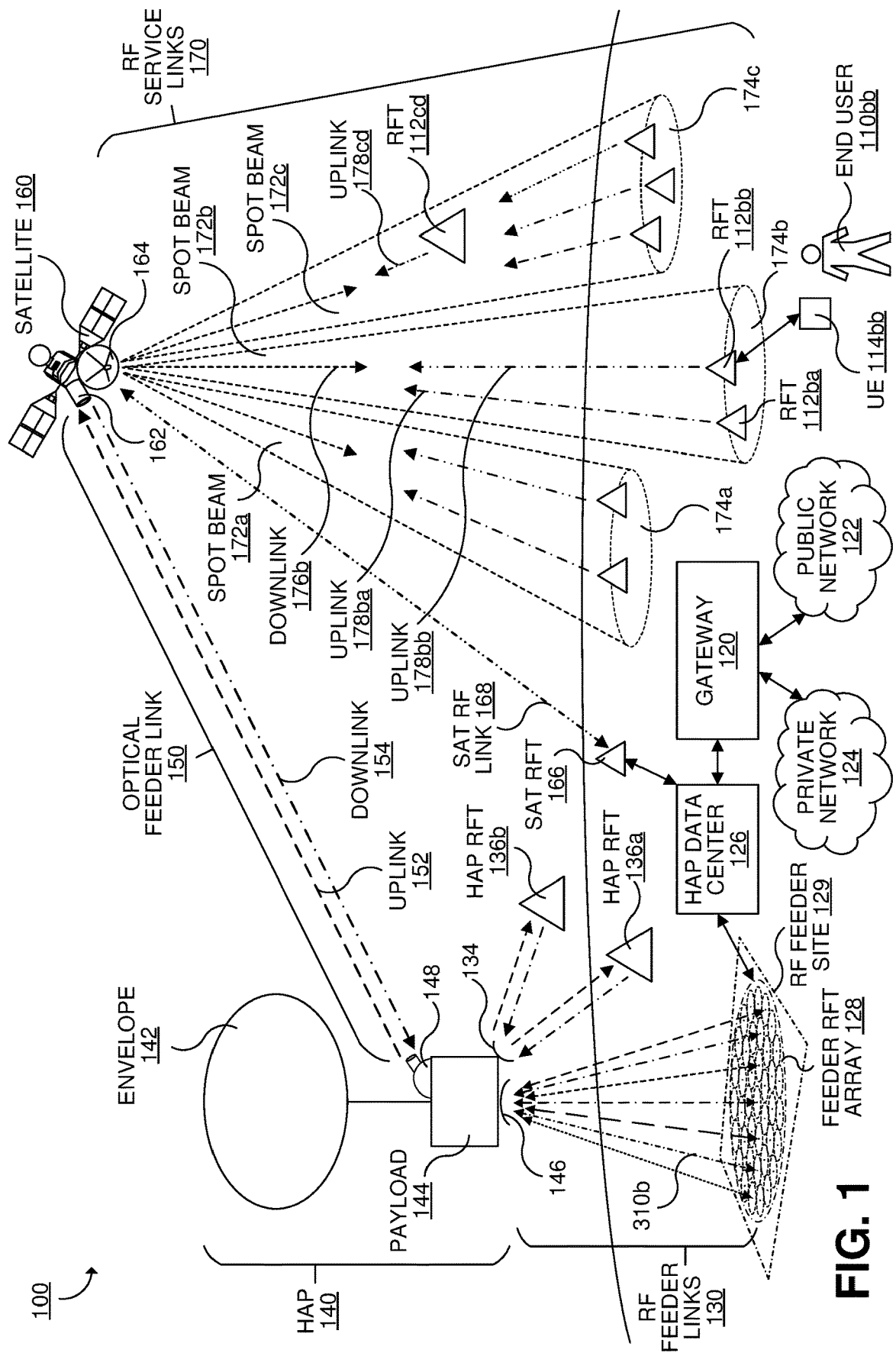
FIG. 1 illustrates an example satellite-based data telecommunication system configured to utilize multiple RF feeder links between a compact feeder RF terminal (RFT) array and a stratospheric high-altitude platform (HAP), a high capacity free space optical (FSO) feeder link between the HAP and a space satellite, and RF service links between the space satellite and a plurality of end user service RF terminals (RFTs).

FIG. 1 illustrates an example satellite-based data telecommunication system 100 (which may be referred to as a "communication system") configured to utilize multiple RF feeder links between a compact feeder RF terminal (RFT) array 128 and a stratospheric high-altitude platform (HAP) 140, a high capacity free space optical (FSO) feeder link 150 between the HAP 140 and a space satellite 160, and RF service links 170 between the space satellite 160 and a plurality of end user service RF terminals (RFTs) 112 (for example, the illustrated ground-based RFTs 112ba and 112bb and air-based RFT 112cd). In some implementations, as illustrated in examples described below, at least 90% (including in some implementations at least 95% or in some implementations at least 99%) of feeder data throughput (in the forward and/or reverse directions) for all of the RF service links 170 operated by a single GEO satellite 160 (including all forward RF service link signals transmitted by the satellite 160 and/or reverse RF service link signals received by the satellite 160) is carried via a single optical feeder link 150 with a single HAP 140 (noting that handoff operations may be performed to change from operating the optical link 150 with a first HAP 140 to a different second HAP 140) and corresponding RF feeder links 130 between the single HAP 140 and a single feeder RFT array 128 at a single RF feeder site 129. For example, the single compact feeder RFT array 128, the single HAP 140, the single satellite 160 can operate together to provide a total forward data capacity of 1 Tbps or greater to a plurality of service RFTs 112 configured to communicate via the RF service links 170 with the satellite 160.

The telecommunication system 100 includes a gateway system 120 (which may be simply referred to as a "gateway") configured to provide the telecommunication system 100 with access to a public data communication network 122 (for example, the Internet) and/or a private data communication network 124, whereby the gateway 120 can receive data from, and send data via, the networks 122 and/or 124. In some implementations, the gateway 120 is configured to perform quality of service (QoS) and/or caching functions to improve performance of the telecommunication system 100. In some implementations, the gateway 120 and/or other systems managed by a network operator are configured to control operation of other aspects of the telecommunication system 100, such as HAP 140 and/or satellite 160. For example, the gateway 120 may be configured to determine how upstream data is distributed via spot beams 172 (which collectively refers to the spot beam transmissions by the satellite 160, such as spot beams 172a, 172b, and 172c shown in FIG. 1). In the example illustrated in FIG. 1, the gateway 120 is configured to send data to, and receive data from, participating service RFTs 112 via a HAP data center 126.

The HAP data center 126 is configured to utilize the feeder RFT array 128, HAP 140, and satellite 160 to exchange data with the service RFTs 112, with the feeder RFT array 128 and HAP 140 each serving as endpoints for a plurality of RF feeder links 130. For providing forward-directed user data received as network data from the gateway 120 as forward link data (encoding the forward-directed user data) to the satellite 160 for distribution to the service RFTs 112, the HAP data center 126 multiplexes, modulates, and encodes data for the spot beams 172 for RF transmission by the feeder RFT array 128. The feeder RFT array 128 includes a compact arrangement of a plurality of ground-based feeder RFTs. For each of a plurality of active HAP-directed RFTs, a respective one of a plurality of RF feeder links 130 (including, in this example, an RF feeder link 310b) each including a respective forward RF feeder link signal (which may be referred to as a "forward RF feeder link" or an "RF feeder uplink") transmitted to the HAP 140. In this particular example, the feeder RFT array 128 includes at least 40 actively operating feeder RFTs concurrently transmitting respective forward RF feeder links. Each of the forward RF feeder links is transmitted at a frequency of at least 60 GHz (in some examples, at least 80 GHz) and has a bandwidth of 10 GHz (5 GHz with right-hand circular polarization (RHCP) and 5 GHz with left-hand circular polarization (LHCP)), providing a total forward RF feeder link bandwidth of 400 GHz from the feeder RFT array 128 to the HAP 140. With an average forward link MODCOD providing a spectral efficiency of 2.5 bps/Hz, a total forward data capacity of at least 1 Tbps may be provided by the feeder RFT array 128. In other examples, different values may be used for the number of feeder RFTs, the number of forward RF feeder links, the transmission frequencies for the forward RF feeder links, the bandwidth of the forward RF feeder links, and/or spectral efficiency. The forward RF feeder links could also utilize beam hopping, frequency reuse of 1, or other arrangements requiring more or less RF bandwidth.

In some implementations, such as in the example shown in FIG. 1, the RF feeder links 130 also each include a respective reverse RF feeder link signal (which may be referred to as a "reverse RF feeder link" or an "RF feeder downlink", and which encodes reverse-directed user data) received from the HAP 140. In this particular example, the same 40 feeder RFTs transmitting the forward RF feeder links are also receiving respective concurrent reverse RF feeder links; each of the reverse RF feeder links is received at a frequency of at least 60 GHz (in some examples, at least 80 GHz) and has a bandwidth of 10 GHz (5 GHz with right-hand circular polarization (RHCP) and 5 GHz with left-hand circular polarization (LHCP)), providing a total reverse RF feeder link bandwidth of 400 GHz from the HAP 140 to the feeder RFT array 128. With a MODCOD providing a spectral efficiency of 1.25 bps/Hz, a total reverse capacity of 500 Gbps is provided by the feeder RFT array 128. The HAP data center 126 is configured to decode, demodulate, and demultiplex the reverse RF feeder links and provide the resulting reverse data streams to the gateway 120. Also, the reverse RF feeder links could be part of a ground-based beam forming system in which the reverse link would comprise return link beam responses and possibly have a larger feeder link requirement.

The HAP 140 is adapted to be deployed in the stratosphere to carry a payload 144 (which may be referred to as a "high-altitude communication device"). The payload 144 could be carried below the HAP 140 as shown, or alternatively it could be contained within the envelope 142 which, in some examples, could be an airship or aircraft. In some portions of this description, the HAP 140 and the payload 144 may be referred to interchangeably. At moderate latitudes, the stratosphere includes altitudes between approximately 10 km and 50 km altitude above the surface. At the poles, the stratosphere starts at an altitude of approximately 8 km. The HAP 140 may generally be configured to operate at altitudes between 17 km and 22 km while operating as an endpoint of the optical feeder link 150 (although other altitudes are possible). This altitude range may be advantageous for several reasons. In particular, this layer of the stratosphere generally has relatively low wind speeds (for example, winds between 5 and 20 mph at lower latitudes) and relatively little turbulence. Further, while the winds between 17 km and 22 km may vary with latitude and by season, the variations can be modeled in a reasonably accurate manner. Additionally, altitudes above 17 km are typically above the maximum flight level designated for commercial air traffic. Therefore, interference with commercial flights is not a concern when the HAP deployed between 17 km and 22 km altitude.

As noted above, the HAP 140 serves as an endpoint of the optical feeder link 150 between the HAP 140 and the satellite 160. Due to the altitude at which the HAP 140 operates, this places the optical feeder link 150 above much of the atmosphere, resulting in substantial reduction in atmospheric attenuations and distortions. At and above such altitudes, the atmosphere contains a minimal amount of dust, water, and other atmospheric particles that often interfere with optical signals in the troposphere. For example, 90% of the Earth's atmospheric mass lies below an altitude of 16 km. Additionally, nearly all atmospheric water vapor or moisture, is found in the troposphere (the lowest layer of the atmosphere) which extends to an altitude of about 10-12 km. This includes clouds, through which operating an optical link can be impossible. Also, in the stratosphere, the next layer above the troposphere, the air is very stable and turbulent mixing is inhibited due to an inverted temperature profile in the stratosphere.

In the example shown in FIG. 1, the HAP 140 is implemented using a high-altitude stratospheric balloon, including an envelope 142. The envelope 142 may take various forms, which may be currently well-known or yet to be developed. For instance, the envelope 142 may be made of metalized Mylar or BoPet. Alternatively or additionally, some or all of the envelope 142 may be constructed from a highly-flexible latex material or a rubber material such as chloroprene. Other materials are also possible. Further, the shape and size of the envelope 142 may vary depending upon the particular implementation. Additionally, the envelope 142 may be filled with various different types of gases, such as helium and/or hydrogen. Other types of gases are possible as well. In some examples, a thin-film photovoltaic may be provided on a portion of the envelope 142 to provide power for the HAP 140, including the payload 144. Although in FIG. 1 the HAP 140 is embodied as a high-altitude stratospheric balloon, other high-altitude platforms may be utilized, such as an airship.

As noted above, the HAP 140 serves as an endpoint of the RF feeder links 130 between the HAP 140 and the feeder RFT array 128. For this purpose, the payload 144 includes a HAP-based RF feeder link antenna 146 (which, in some examples, may include multiple antennas) for receiving forward RF feeder links from the feeder RFT array 128 and, in some examples, transmitting reverse RF feeder links to the feeder RFT array 128.

Ideally, the HAP 140 would operate directly above the feeder RFT array 128, with a zenith distance of 0° with respect to the feeder RFT array 128. However, the HAP 140 is expected to move about horizontally, such as due to wind forces. Due to the compact arrangement and large number of the feeder RFTs included in the feeder RFT array 128, the HAP 140 must operate within a first lateral distance or angle of the feeder RFT array 128 in order to achieve a target number of active RF feeder links 130 corresponding to full bandwidth capacity without unacceptable levels of interference among the RF feeder links 130 (in either the forward or reverse direction). The telecommunication system 100 may be configured to perform station keeping operations for HAP 140 to maximize an amount of time that the HAP 140 operates within that particular lateral distance or angle. In some examples, the station keeping operations may account for the availability of multiple HAPs operating in proximity to the feeder RFT array 128. Station keeping operations may include changes in the altitude of the HAP 140 to take advantage of winds of varying speeds and directions present at different altitudes.

The RF feeder link antenna 146 (which may also be referred to as a "gateway antenna") may be implemented with a single multi-beam antenna with multiple feeds to provide the target number of active RF feeder links 130 to reach full capacity. Changes in altitude may cause the angular spacing between the RF feeder links 130 to change. In some implementations, the HAP 140 may be configured to change angular spacing of the RF feeder links 130 by mechanically moving feeds of the RF feeder link antenna 146. In some implementations, the RF feeder antenna link 146 may be implemented using a phased array antenna (which may be referred to as an "electronically steered antenna"), with which electronic beam steering can be performed. A phased array antenna provides fast beam steering, including an ability to generate simultaneous beams and dynamically adjust the characteristics of the beam patterns. As a result, a phased array antenna offers improved performance over mechanical means for beam steering in response to movements of the HAP 140.

In some implementations, 70-80 GHz or higher RF bands are suitable as they allow multiple RF feeder terminals to be positioned in a compact arrangement in a relatively small area due to the small beam widths that can be achieved at these frequencies and extensive reuse that can be achieved in a small area, although other bands may be used as well. Additionally, use of very high RF frequencies, such as so-called "millimeter wave" frequencies, for the RF feeder links 130 permits operation from a single RF feeder link site 129, rather than an expensive widely distributed backbone network with diverse sites. Mature technologies are available for such RF frequencies, such as technologies developed for terrestrial microwave and 5G cellular radio systems. Additionally, the compact size of the feeder RFT array 128 and the high directionality of the RF feeder links 130 reduces concerns about RF interference with other RF applications.

As the RF feeder links 130 operate over a much smaller distance than a ground-to-satellite RF link (such as the satellite RF link shown in FIG. 1), adequate margin can be achieved to overcome E-band fading at a single site, thus avoiding a need for diversity. Additionally, although a site with generally clear weather conditions is favorable, a wider range of locations are practical than with a ground to GEO RF link operating at a distance of approximately 36,000 km.

The following example RF link budget is illustrative for the RF feeder links 130 with the HAP 140 operating at an altitude of 22 km (although a larger HAP antenna, which is more practical with a phased array antenna, yields narrower beams and a smaller feeder RFT array 128):

| | |
|---|---|
| Free space loss at 22 km | 156.2 dB |
| Gas absorption loss (0.4 dB/km) | 8.8 dB |
| Fade margin @ NLV 99.5% | 25 dB |
| RF feeder terminal antenna diameter | 60 cm |
| Tx gain | 50 dB |
| RF feeder terminal EIRP | 50 dBW (with 1 W PA) |
| Rx noise figure | ~5 dB |
| Ts | 600K (27.8 dB) |
| HAP antenna diameter | 60 cm |
| Rx gain | 50 dB |
| G/T | 22.2 dB/K |
| C/No | 110.8 dB |
| | (50 + 22.2 − 156.2 + 228.6 − 25 − 8.8) |
| Bandwidth | 5 GHz (97 dBHz) |
| C/N | 13.8 dB |

To accurately and precisely aim the plurality of beams of the HAP-based RF feeder link antenna 146 to their respective RF feeder terminals in the compactly arranged feeder RFT array 128, and maintain the RF feeder links 130 while the HAP 140 moves around (with various, and sometimes high frequency, changes in roll, pitch, and yaw), the HAP 140 includes an antenna stabilizer mechanism. The antenna stabilizer mechanism may include a mechanical antenna positioner (such as a 3-axis gimbal) configured to selectively orient, for example, a main reflector of the RF feeder link antenna 146, one or more mechanical antenna feed positioners (which can more rapidly reposition individual feeds, which have significantly less mass than the main reflector), and/or a phased array antenna. For example, a mechanical antenna positioner can perform coarse/slow positioning and be used in combination with a phased array antenna respond to higher frequency changes in roll, pitch, and yaw of the HAP 140.

In some implementations, as in the example shown in FIG. 1, the payload 144 may include one or more additional RF terminal communication antennas 134 to provide one or more RF communication services for end-user RFTs 136, such as the illustrated ground-based RFT 136a and the air-based RFT 136b. In some examples, a portion of the RF feeder links 130 provides backhaul for these services. Due to the high altitude at which the HAP 140 operates, a significant land area is within a field of view of the RF terminal communication antennas 134, facilitating use of spot beams and frequency reuse. Example RF communication services include, but are not limited to, cellular communication services and wireless internet access. Use of the HAP 140 for these other purposes can reduce or divide costs of operating the HAP 140. In some examples, one or more of the RF communication services is operated by a third party different than the party operating the HAP 140 and/or the satellite 160.

The payload 144 includes a HAP-based optical feeder communication system 148 which is used to establish and maintain the optical feeder link 150 in the form of one or more FSO links (for example, modulated laser links) between the HAP 140 and the satellite 160. The optical feeder link 150 may include an forward optical feeder link signal 152 (which may be referred to as a "forward optical feeder link" or an "optical feeder uplink") transmitted by an optical transmitter included in the optical feeder communication system 148 and received by the satellite 160. The optical feeder link 150 may include an reverse optical feeder link signal 154 (which may be referred to as a "reverse optical feeder link" or an "optical feeder downlink") transmitted by the satellite 150 and received by an optical receiver included in the optical feeder communication system 148. The payload 144 is configured to, via the optical feeder communication system 148, convert and multiplex multiple forward link transmissions included in the RF feeder links 130 into the forward optical feeder link 152, and convert and demultiplex the reverse optical feeder link 154 into multiple reverse RF feeder link transmissions included in the RF feeder links 130. By operating the optical feeder link 150 outside of the troposphere, many substantial optical link issues encountered with FSO links through the troposphere are avoided, such as, but not limited to, cloud obstruction, the higher water content of the troposphere, substantial turbulence in the troposphere and resulting fading, and reduced wavelength-dependent refraction (which could negatively impact the effectiveness of WDM optical modulation schemes). By avoiding these issues, a need for optical diversity (multiple optical links at geographically diverse locations) may be eliminated or reduced, the optical electronics simplified, and an analog transparent architecture may possibly be enabled.

The optical feeder communication system 148 includes one or more optical telescopes including a combination of optics (such as refractive lenses and/or reflective mirrors) for transmitting and directing the forward optical feeder link 152 and/or the reverse optical feeder link 154. In some examples, a single "duplex" optical telescope may be used for both the forward optical feeder link 152 and the forward optical feeder link 154. Use of a single optical telescope may simplify mechanical aspects of pointing, acquisition, and tracking (PAT) of the optical feeder link 150 between the HAP 140 and the satellite 160, as it reduces the problem to a single optical telescope that must perform PAT at approximately microradian accuracy despite motion of the HAP 140 as it operates. In some examples, the optical feeder communication system 148 includes a first optical telescope for transmitting the forward optical feeder link 152 and a second optical telescope for receiving the reverse optical feeder link 154. By having separate telescopes, the optical chains for transmitting and receiving the optical feeder link 150 may be simplified (for example, by avoiding one or more beamsplitter and/or filter elements used in a duplex telescope), resulting in increased gain and/or signal quality. Separate telescopes also help avoid or eliminate optical crosstalk between a sensor being used to capture a very weak reverse optical feeder link 154 and transmission of a much stronger (for example, by about 110 dB) forward optical feeder link 152. In some examples, the optical feeder communication system 148 includes multiple optical transmitters; for example, to reduce effects of turbulence or to divide the transmitted optical power among multiple telescopes, rather than demanding a single telescope suitable for a higher power optical signal.

The optical feeder communication system 148 is configured to accurately and precisely perform optical pointing for the optical feeder link 150 while the HAP 140 rolls, pitches, yaws, climbs/descends, turns, and translates. Although, as discussed above, similar pointing operations are performed for the RF feeder link antenna 146, a far higher degree of precision and accuracy is demanded for PAT of an optical signal with a divergence of approximately 15 microradians with a GEO satellite 160. Towards this purpose, the optical feeder communication system 148 includes, for each optical telescope, a pointing mechanism that simultaneously performs motion stabilization and PAT.

For a 35,800 km space-based optical link, the following link budget for an optical link operating at 2.5 Gbps using 4-inch telescopes at both the HAP 140 and the satellite 160 is illustrative:

| Transmit power | 40 | dBm |
|---|---|---|
|  | 10 | W |
| Frequency | 193 | THz |
| Wavelength | 1550 | nm |
| Tx telescope diameter | 10.2 | cm |
| Tx telescope gain | 109.3 | dB |
| Tx loss | −2.0 | dB |
| Strehl ratio | −0.4 | dB |
| Pointing loss | −3.0 | dB |
| Beam divergence | 19.3 | μrad |
| Beam size at GEO | 700 | m |
| Path loss | −289.3 | dB |
| Rx telescope diameter | 10.2 | cm |
| Rx telescope gain | 106.3 | dB |
| Rx loss | −2.0 | dB |
| Receive power | −41.1 | dBm |
| Receive sensitivity | 90 | photons/bit |
| Required power | −45.4 | dBm |
| Link margin | 4.3 | dB |

For 1 Tbps forward data capacity, using the same telescopes the transmit power would be increased to an estimated 66 dBm, or approximately 4 kW. However, although in some implementations it is not desirable to increase the size of the telescope aperture at the HAP 140 (for example, to reduce telescope mass for motion stabilization), the size of the telescope aperture may be increased at the satellite 140, in view of substantially reduced problem of motion stabilization, in order to achieve increase gain and achieve corresponding reductions in transmit power. It is noted that the wavelength of 1550 nm is merely an example, and that other wavelengths may be used (including, but not limited to, other wavelengths around 1550 nm and wavelengths around 850 nm or 1064 nm). In some implementations, wavelength division multiplexing (WDM) may be used to concurrently operate the optical feeder link at multiple wavelengths, at lower individual bitrates, resulting in corresponding improvements to the optical link budget. Dense wavelength division multiplexing (DWDM) may be used to multiplex many optical channels into the optical feeder link.

The space satellite 160 (which may simply be referred to as a "satellite") serves as another endpoint of the optical feeder link 150, and as an endpoint for the RF service links 170. In the example shown in FIG. 1, the satellite 160 is a GEO satellite, with an orbit that maintains the satellite 160 over a fixed longitude of the Earth's surface. A GEO satellite 160, issues such as maintaining, distributing, and calculating ephemera of the orbit of the satellite 160 can be avoided, along with tracking satellite 160 across the sky, obstruction of a portion of the sky by the envelope 142, and optical link issues when the satellite 160 is at low elevations. However, in some implementations, the satellite 160 can be a medium earth orbit (MEO) or a low earth orbit (LEO), and/or may be one of multiple satellites operating in a constellation of satellites. The satellite 160 is configured to convert and demultiplex the forward optical feeder link 152 into transmissions for forward RF service links (for example, as forward RF service links 176 via respective spot beams 172) included in the RF service links 170, and is configured to convert and multiplex multiple reverse RF service link transmissions (for example, for reverse RF service links 118 and 178) included in the RF service links 170 into the reverse optical feeder link 154. The satellite 160 includes a satellite-based optical feeder communication system 162, which may be configured much as described in connection with the HAP-based optical feeder communication system 148. However, as the satellite 160 does not experience frequent changes in movement, tracking the HAP 140 is simplified, which may allow use of larger aperture telescopes despite the accompanying increase in moving mass and narrower divergence. In some implementations, the satellite 160 may concurrently operate as an endpoint for multiple different optical links 150 with multiple different HAPs 140 (which may be a different locations). For example, the satellite 160 might be configured to concurrently operate a first optical feeder link 150 with a first HAP 140 and a second optical feeder link 150 with a second HAP 140. To avoid optical crosstalk, the multiple forward optical feeder links 152 may be operated in different bands, such as a first forward optical feeder link in the ITU C-band (1530-1565 nm) and a second forward optical feeder link in the ITU L-band (1565-1625 nm). The ITU S-band (1460-1530 nm), the U-band (1625-1675 nm), and/or the 3-5 μm portion of the CIE IR-C band may also be used for the optical feeder link 150, although there are fewer commercial product options in these bands due to the dominance of the ITU C-band for long-distance telecommunications. For example, DWDM hardware is mostly available for the ITU C-band and the ITU L-band.

The satellite 160 includes a satellite-based RF communication system 164 which is used for the RF service links 170, including transmitting forward RF service links 176 (such as the forward RF service link 176b) to end user service RFTs 112 and receiving reverse RF service links 178 (such as the reverse RF service links 178ba, 178bb, and 178cd) from the end user service RFTs 112. An end user service RFT 112 may also be referred to as a "user terminal" (UT) or more simply an "RFT". In some examples, the RF service links 170 are in one or more fixed satellite service downlink frequency bands, such as, but not limited to, the Q-band at 40-42 GHz, the Ka-band in the 18-20 GHz range, and the Ku-band in the 12-18 GHz range. Use of RF service links 170 in these more traditional bands facilitates user of lower cost end user service RFTs 112 and/or use of existing end user service RFTs 112. An end user service RFT 112 may be connected to one or more items of user equipment (UE) 114 (such as the UE 114bb) which may be associated with one or more end users 110.

In some implementations, as shown in FIG. 1, the RF communication system 164 provides the RF service links 170 via multiple spot beams 172 covering respective regions 174 (such as the spot beams 172a, 172b, and 172c for respective regions 174a, 174b, and 174c). For each spot beam 172 there is a single respective forward RF service link 176 (such as the forward RF service link 176b for the spot beam 172b), and multiple reverse RF service links 178 (such as the reverse RF service links 178*ba*, 178*bb*, and 178*cd* for respective RFTs 112*ba*, 112*bb*, and 112*cd*) via a variety of multiplexing techniques. In some examples, a single forward RF service link 176 may utilize multiple carriers or use a multicarrier modulation such as orthogonal multicarrier modulation (OFDM). The use of spot beams 172 may be combined with frequency reuse, in which the spot beams 172 are operated in multiple "colors" with different combinations of frequency ranges and polarization. With the use of spot beams 172, the RF communication system 164 can achieve higher gain and greater total capacity. Additionally, the telecommunication system 100 may be configured to selectively and dynamically reallocate bandwidth to the spot beams 172.

In some implementations, the HAP data center 126 includes a satellite RFT 166 used to operate a satellite RF link 168 between the HAP data center 126 and the satellite 160 for use as a command/control channel with the satellite 160. Another RF link (not shown in FIG. 1) may be established between the HAP data center 126 and the HAP 140 as a command/control channel with the HAP 140. The HAP data center 126 may be configured to use these RF links for command/control operations for satellite 160 and/or HAP 140. Such operations may include, but are not limited to, obtaining location and/or movement information from the HAP 140, control station keeping operations performed by the HAP 140, coordinate station keeping operations among multiple HAPs 140, facilitating PAT of the optical feeder link 150 (for example, by reducing acquisition time), and/or facilitating PAT of optical links between HAPs 140. In some implementations, an RF link may be established directly between the HAP 140 and the satellite 160, and the HAP 140 and the satellite 160 are configured to utilize the RF link to exchange data facilitating PAT of the optical feeder link 150.

Figure 2A:
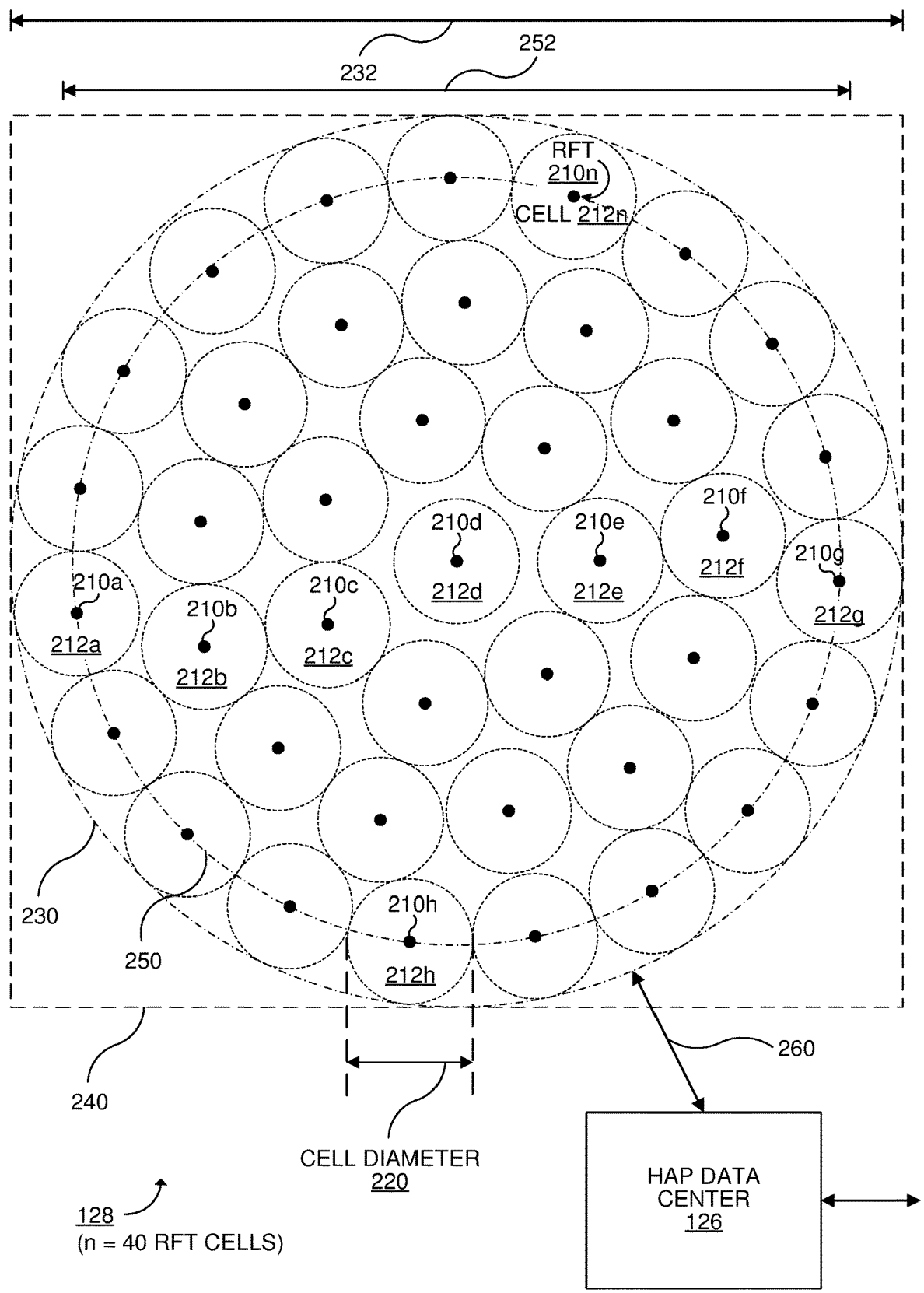
FIG. 2A illustrates a plan view of an example of the feeder RFT array shown in FIG. 1.

FIG. 2A illustrates a plan view of an example of the feeder RFT array 128 shown in FIG. 1. In this example, the feeder RFT array 128 has 40 feeder RFTs 210, including the labeled feeder RFTs 210*a*, 210*b*, 210*c*, 210*d*, 210*e*, 210*f*, 210*g*, 210*h*, and 210*n*. The feeder RFT array 128 may include more or less than the illustrated 40 feeder RFTs 210 to realize various implementation goals, such as, but not limited to, a target total operating capacity of the RF feeder links 130, a maximum total operating capacity of the RF feeder links 130, and/or an amount of "spare" feeder RFTs 210 to avoid reductions in operating capacity arising maintenance or failures of the feeder RFTs 210. As noted previously, the feeder RFTs 210 of the feeder RFT array 128 are collocated together at a single RF feeder site 219 (which may be referred to as a "location" of the feeder RFT array 128 and its feeder RFTs 210), which offers substantial reductions in network costs over other feeder architectures involving multiple feeder sites at different locations.

In some implementations, the feeder RFTs 210 are individually steerable via respective beam steering mechanisms. A beam steering mechanism included in a feeder RFT 210 may include a mechanical antenna positioner (such as a 2-axis gimbal) configured to selectively orient, for example, a main reflector of the feeder RFT 210, a mechanical antenna feed positioner (which can more rapidly reposition a feed, which has significantly less mass than the main reflector), and/or a phased array antenna. For example, a mechanical antenna positioner can perform coarse/slow positioning and be used in combination with a phased array antenna respond to higher frequency changes in azimuth and elevation of the HAP 140.

In FIG. 2A, each of the feeder RFTs 210 is shown within a respective RFT cell 212, including feeder RFTs 210*a*, 210*b*, 210*c*, 210*d*, 210*e*, 210*f*, 210*g*, 210*h*, and 210*n* within respective RFT cells 212*a*, 212*b*, 212*c*, 212*d*, 212*e*, 212*f*, 212*g*, 212*h*, and 212*n*). The RFT cells 212 are not physical elements of the feeder RFT array 128, but instead illustrate that the feeder RFTs 210 are positioned in a compact arrangement with distances between adjacent feeder RFTs 210 that maintains interference among the RF feeder links 210 below an acceptable or target level. In the example shown in FIG. 2A, each of the cells 212 is circular and has the same RFT cell diameter 220 (as shown for the RFT cell 212*h*). As a result, each feeder RFT 210 is at least the distance of the RFT cell diameter 220 from any other feeder RFT 212. The RFT cell diameter 220 may also be referred to as a minimum distance between individual feeder RFTs 210. It is noted that other shapes and/or sizes can be used for the RFT cells 212, and that shapes, sizes, and or orientations can be different among the RFT cells 212. For example, the RFT cells 212 might vary in size in accordance with a distance from a center of the feeder RFT array 128, with larger RFT cells 212 around the periphery, to reduce interference at increased zenith distances for the HAP 140 at which the feeder RFT array 128 is viewed obliquely from the HAP 140. Sizes of the RFT cells 212 may account for frequency reuse factor for the RF feeder links 130, which permits for smaller RFT cell sizes. Use of a larger HAP-based RF feeder link antenna 146 allows narrower beams to be formed for the RF feeder link 130, which allows for smaller RFT cell sizes to be used. Additionally, an expected maximum operating altitude for the HAP 140 will affect the RFT cell sizes.

In FIG. 2A, the RFT cells 212 are positioned in a compact circular arrangement, with all of the RFT cells 212 fitting within, and being encompassed by, a circular area 230 with a diameter 232 (which may also be referred to as a "span" of the feeder RFT array 128). An arrangement of the RFT cells 212 that minimizes the diameter 232 is considered the most "compact" arrangement of the RFT cells 212 and the feeder RFTs 210 positioned therein. In FIG. 2A, the feeder RFTs 210 connect with the HAP data center 126 by a local network of wire and/or fiber data links (see communication link 260). By reducing the diameter 232, a corresponding land area for installing and operating the RF feeder array 130 is reduced, as well as the lengths of power and signal couplings for the RF feeder array 130. Also, the more compact the arrangement of RFTs 210, the less stringent the design requirements will be on the HAP-based RF feeder link antenna 146. Compact arrangements of the feeder RFT array 128 minimize the lengths and costs of the local network, in contrast to conventional use of wide area fiber network connections between different cities where RFTs are located. In this example, the 40 RFT cells 212 are arranged to occupy approximately 79% of the circular area 230. FIG. 2A also illustrates a square area 240 with sides having lengths equal to the diameter 232, which illustrates an example of a tract of land that might be used to construct the RF feeder array 128. Additionally, FIG. 2A illustrates a second circular area 250, with a diameter 252, which represents a smallest circular area encompassing the center points of the feeder RFTs 210, which closely corresponds an area in which the feeder RFTs 210 may all be constructed.

Figure 2B:
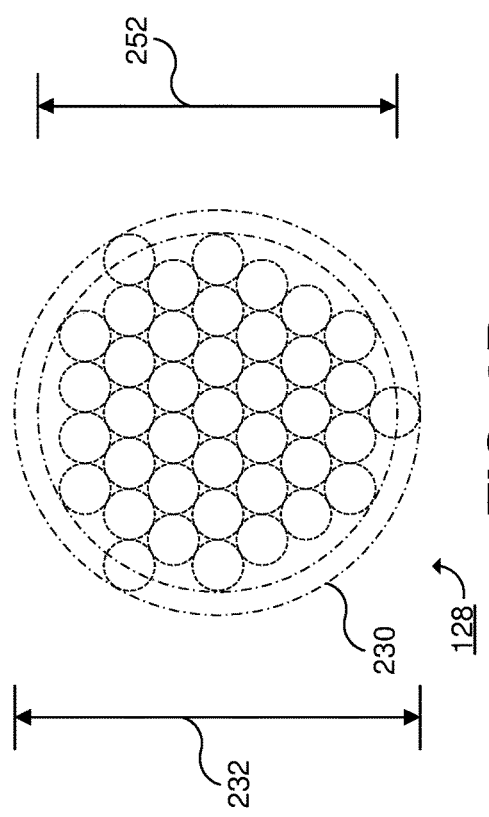
FIG. 2B illustrates an alternative compact arrangement of the 40 feeder RFTs shown in FIG. 2A, with the RFT cells arranged hexagonally.
Figure 2D:
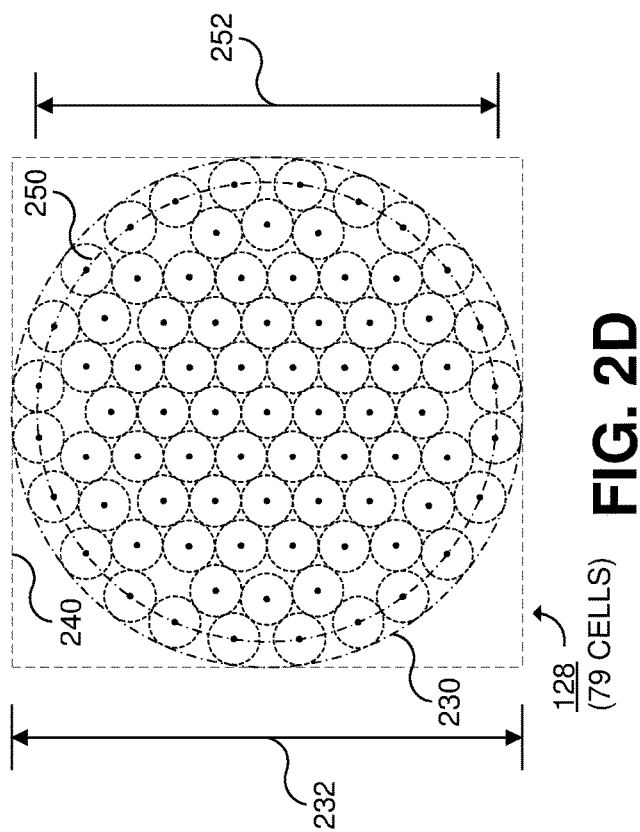
FIG. 2D illustrates an example of the feeder RFT array with 79 feeder RFTs.
Figure 2C:
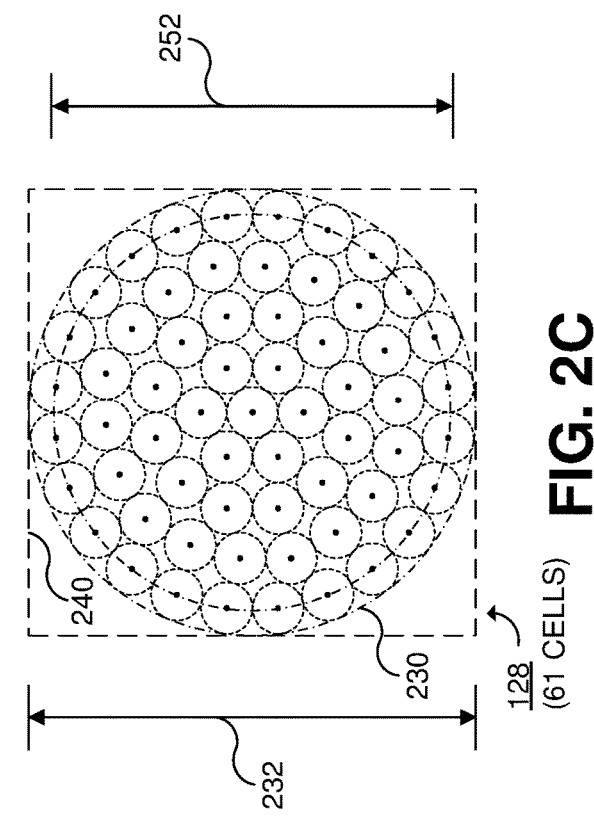
FIG. 2C illustrates an example of the feeder RFT array with 61 feeder RFTs.

FIG. 2B illustrates an alternative compact arrangement of the 40 feeder RFTs 210 shown in FIG. 2A, with the RFT cells 212 arranged hexagonally. However, with this arrangement, the 40 RFT cells 212 occupy only approximately 64% of the circular area 230, and the diameter 232 is increased by about 11% over the more compact arrangement shown in FIG. 2B. For purpose of further illustration, FIG. 2C illustrates an example of the feeder RFT array 128 with 61 feeder RFTs 210, and FIG. 2D illustrates an example of the feeder RFT array 128 with 79 feeder RFTs 210. In addition to providing greater numbers of feeder RFTs 210, the examples shown in FIGS. 2C and 2D also have rotational symmetry, which can facilitate accommodating rotation of the HAP 140 in establishing and/or maintaining the RF feeder links 130.

Tables 1-5 below provide illustrative examples of RFT cell sizing considerations and dimensions for the RFT feeder terminal array 128, with collocation of the feeder RFTs 210 at a single location, according to various design parameters for the feeder RFT arrangements shown in FIG. 2A (with 40 feeder RFTs), FIG. 2C (with 61 feeder RFTs), and FIG. 2D (with 79 feeder RFTs). For these examples, it may be assumed each RFT terminal 210 would offer 10 GHz forward bandwidth (81-86 GHz with two polarizations in the forward direction, although frequencies of 71-76 GHz in the reverse direction, also with two polarizations, are conservatively represented as 70 GHz below to illustrate a maximum spacing) and 2.5 bits/Hz (thus requiring a total of 400 GHz forward RF bandwidth for 1 Tbps forward data capacity). This would involve at least 40 feeder RFTs (as shown in FIG. 2A) to support 1 Tbps forward data capacity. Table 1, below, shows, for two HAP antenna sizes of 60 cm and 200 cm, RFT cell sizing considerations involving a frequency reuse factor of 1 and altitudes of 15 km and 22 km for the HAP 140. The RFT reuse spacing is computed for a reuse factor of 1 and for a hexagonal grid with spacing $R \cdot \sqrt{3}$, where R is half of the half power beam width (HPBW). Additional margin is added to the calculated spacing to be conservative.

TABLE 1

RF Feeder Antenna Array Cell Sizing Considerations

| HAP Antenna Size | 200 cm | 60 cm |
|---|---|---|
| Frequency (Reverse Links) | 70 GHz | 70 GHz |
| HPBW (21/(fD)) @ 70 GHz | 0.15° | 0.50° |
| HPBW (21/(fD)) @ 80 GHz | 0.13125° | 0.4375° |
| Reuse Spacing (R · √3) | 0.130° | 0.433° |
| Reuse Spacing (15 km) | 34 m | 114 m |
| Reuse Spacing (22 km)/ RFT cell diameter | 50 m (use 75 m) | 167 m (use 200 m) |

Tables 2 and 3, below, show the resulting dimensions for the feeder RFT array 128 with 40 cells, 61 cells, 79 cells, and 109 cells where the HAP-based RF feeder link antenna 146 has a diameter of 200 cm.

TABLE 2

Example RF Feeder Array Dimensions for 200 cm Antenna (75 m cell size) (encompassing cells, as shown for circular area 230)

| Number of cells | 40 | 61 | 79 | 109 |
|---|---|---|---|---|
| Array Diameter (m) | 535 | 650 | 743 | 868 |
| Circular Area (acres) | 56 | 82 | 108 | 146 |
| Square Area (acres) | 71 | 105 | 137 | 186 |
| Angular FOV @ 15 km | 2.04° | 2.48° | 2.84° | 3.32° |
| Angular FOV @ 22 km | 1.40° | 1.70° | 1.94° | 2.26° |

TABLE 3

Example RF Feeder Array Dimensions for 200 cm Antenna (75 m cell size) (encompassing only centers of feeder RFTs, as shown for circular area 250)

| Number of cells | 40 | 61 | 79 | 109 |
|---|---|---|---|---|
| Array Diameter (m) | 464 | 579 | 672 | 797 |
| Circular Area (acres) | 42 | 65 | 88 | 123 |
| Square Area (acres) | 53 | 83 | 112 | 157 |
| Angular FOV @ 15 km | 1.77° | 2.21° | 2.57° | 3.04° |
| Angular FOV @ 22 km | 1.21° | 1.51° | 1.75° | 2.08° |

Thus, according to the conditions used for Tables 2 and 3, the feeder RFT array 128, usable for a forward data capacity of at least 1 Tbps, can be constructed with the margins offered by 79 feeder RFTs (roughly double those offered by 40 feeder RFTs) within diameters 230 and 250 of less than 800 meters, a total operating beam width for the RF feeder links 130 of less than 2.9°, and an FOV of less than 2.6°. With the margins offered by 61 RFTs (roughly 50% more than offered by 40 feeder RFTs), the feeder RFT array 128 can be constructed within diameters 230 and 250 of less than 700 meters, a total operating beam width for the RF feeder links 130 of less than 2.5°, and an FOV of less than 2.3°.

Tables 4 and 5, below, show the resulting dimensions for the feeder RFT array 128 with the same 40 cells, 61 cells, 79 cells, and 109 cells, but where the HAP-based RF feeder link antenna 146 has a reduced diameter of 60 cm, resulting in increased beam widths for the RF feeder links 130.

TABLE 4

Example RF Feeder Array Dimensions for 60 cm Antenna (200 m cell size) (encompassing cells, as shown for circular area 230)

| Number of cells | 40 | 61 | 79 | 109 |
|---|---|---|---|---|
| Array Diameter (m) | 1425 | 1732 | 1981 | 2313 |
| Circular Area (acres) | 394 | 583 | 762 | 1038 |
| Square Area (acres) | 502 | 742 | 970 | 1322 |
| Angular FOV @ 15 km | 5.44° | 6.61° | 7.56° | 8.82° |
| Angular FOV @ 22 km | 3.71° | 4.51° | 5.16° | 6.02° |

TABLE 5

Example RF Feeder Array Dimensions for 60 cm Antenna (200 m cell size) (encompassing only centers of feeder RFTs, as shown for circular area 250)

| Number of cells | 40 | 61 | 79 | 109 |
|---|---|---|---|---|
| Array Diameter (m) | 1229 | 1536 | 1785 | 2117 |
| Circular Area (acres) | 293 | 458 | 619 | 870 |
| Square Area (acres) | 374 | 583 | 788 | 1107 |
| Angular FOV @ 15 km | 4.70° | 5.87° | 6.82° | 8.08° |
| Angular FOV @ 22 km | 3.20° | 4.00° | 4.65° | 5.51° |

Thus, according to the conditions used for Tables 4 and 5, the feeder RFT array 128, usable for a forward data capacity of at least 1 Tbps, can be constructed with the margins offered by 79 feeder RFTs (roughly double those offered by 40 feeder RFTs) within a diameter 230 of 2000 meters and a diameter 250 of less than 1800 meters, a total operating beam width for the RF feeder links 130 of less than 7.6°, and an FOV of less than 6.9°. With the margins offered by 61 RFTs (roughly 50% more than offered by 40 feeder RFTs), the feeder RFT array 128 can be constructed within a diameter 230 of 1800 meters and a diameter 250 of less than 1600 meters, a total operating beam width for the RF feeder links 130 of less than 6.7°, and an FOV of less than 6°. As can be seen from Tables 2-5, the decrease from 200 cm to 60 cm results in approximately a 7-fold increase in the area for the feeder RFT array 128. Despite this, the providing the RF feeder links 130 with a single location can still be significantly more cost effective than architectures involving diversity sites.

As shown in FIGS. 1 and 2, the HAP data center 126 is communicatively coupled to the feeder RFT array 128 via a communication link 260 and is configured to control operation of the feeder RFTs 210, generate forward RF feeder link signals for transmission to the HAP 140 via the RF feeder links 130, provide the generated forward RF feeder link signals to the feeder RFTs for transmission, obtain reverse RF feeder link signals received by the feeder RFTs from the HAP 140 via the feeder links 130, and process the obtained reverse RF feeder link signals. For example, HAP data center 126 may be configured to provide signals to, and receive signals from, the feeder RFTs 210 via electronic cables and/or optical fiber included in the communication link 260.

Figure 3:
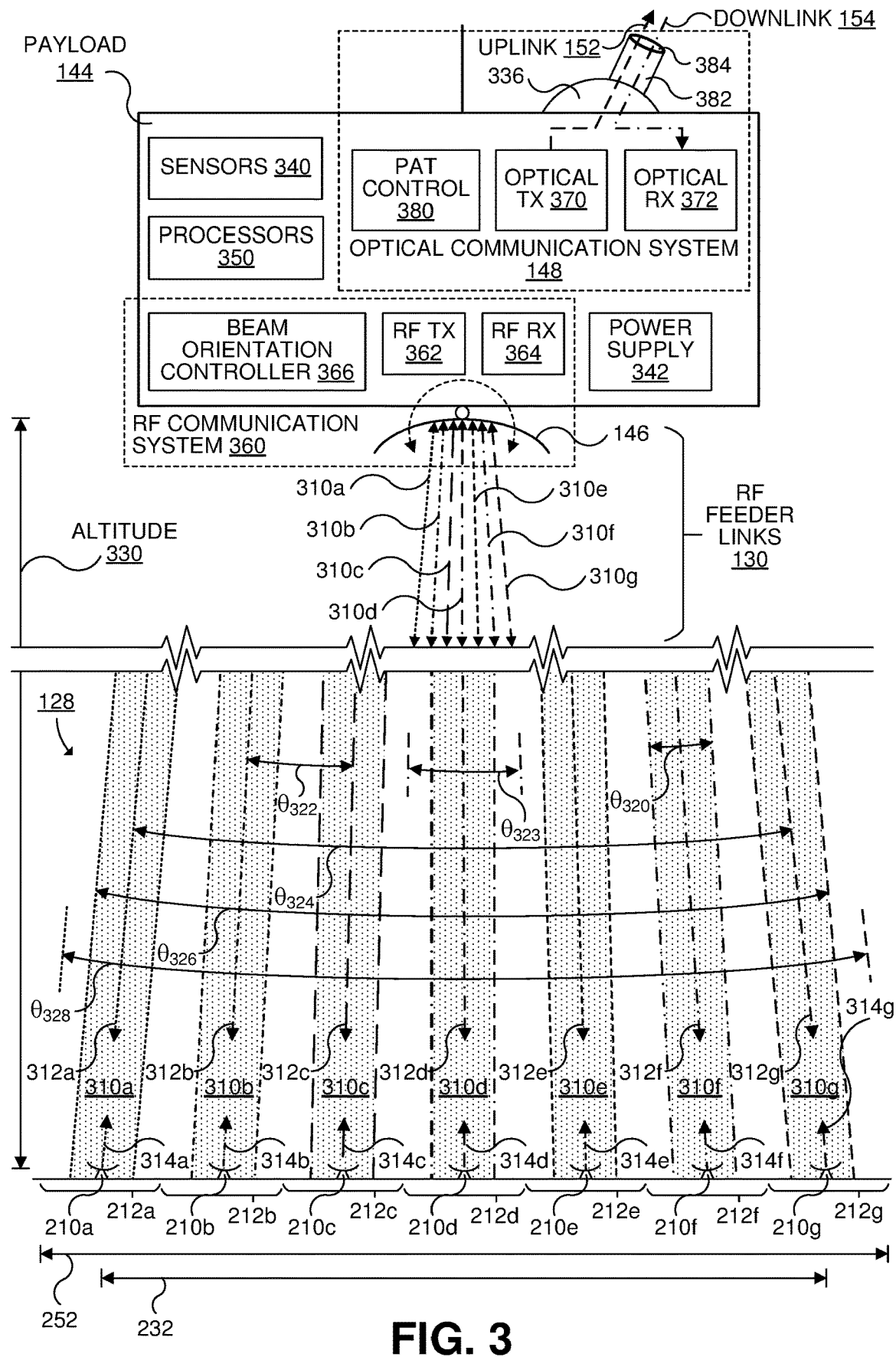
FIG. 3 illustrates further details of the payload of the HAP shown in FIG. 1 and examples of operations performed by the payload in connection with the RF feeder links and the optical feeder link.

FIG. 3 illustrates further details of the payload 144 of the HAP 140 shown in FIG. 1 and examples of operations performed by the payload 144 in connection with the RF feeder links 130 and the optical feeder link 150. At the time illustrated in FIG. 3, the HAP 140 is positioned at an altitude 330 directly above the feeder RFT array 128 with a zenith distance of 0°. At the bottom of FIG. 3 is shown a portion of the feeder RFT array 128 with 40 feeder RFTs 210 shown in FIG. 2A. More specifically, FIG. 3 shows the feeder RFTs 210a, 210b, 210c, 210d, 210e, 210f, and 210g, within their respective RFT cells 212a, 212b, 212c, 212d, 212e, 212f, and 212g. A plurality of RF feeder links 130 are concurrently operating between the feeder RFT array 128 and the HAP 140, including RF feeder links 310a, 310b, 310c, 310d, 310e, 310f, and 310g, corresponding to respective feeder RFTs 210a, 210b, 210c, 210d, 210e, 210f, and 210g, including their respective reverse RF feeder links 312a, 312b, 312c, 312d, 312e, 312f, and 312g (transmitted by respective feeds of the RF feeder link antenna 146 and having expanded to the shaded areas in the bottom portion of FIG. 3) and their respective forward RF feeder links 314a, 314b, 314c, 314d, 314e, 314f, and 314g (transmitted by the feeder RFT array 128 and received by respective feeds of the RF feeder link antenna 146).

FIG. 3 shows various angles with respect to the RF feeder link antenna 146 (which may also be referred to as FOV angles). The illustrated angles are dependent on the altitude 330 and, for some of the illustrated angles, by the zenith direction of the HAP 140 relative to the feeder RFT array 128. For purposes of the description of these angles in FIG. 3, RF feeder link antenna 146 has a diameter of 200 cm, the HAP is at an altitude 330 of 22 km, all of the reverse RF feeder links are at a frequency of 70 GHz, and the corresponding portions of Tables 1-3 apply. Angle $\theta_{320}$ is an angular beam width of the reverse RF feeder link 312f, such as a half power beam width (HPBW); in this example, angle $\theta_{320}$ is approximately 0.15°. In this example, all of the reverse RF feeder links have approximately the same angular beam width. Angle $\theta_{322}$ is an angular separation of adjacent feeder RFTs 310b and 310c. Angle $\theta_{323}$ is an angular width of the RFT cell 212d. In this example, all of the RFT cells 212 have approximately the same diameter of 75 meters and angles $\theta_{322}$ and $\theta_{323}$ are both approximately 0.196°. Angle $\theta$324 is the angular width of the circular area 250 (with diameter 232 at ground level); approximately 1.21° in this example. Angle $\theta_{326}$ is the angular width of the smallest circle encompassing the beam widths of the reverse RF feeder links; approximately 1.36° in this example. Angle $\theta_{328}$ is the angular width of the circular area 230 (with diameter 252 at ground level); approximately 1.40° in this example.

The payload 144 includes a power supply 342 to supply power to the various components of the payload 144. The power supply 342 may include a rechargeable battery. In other embodiments, the power supply 342 may additionally or alternatively include other means known in the art for producing power. In addition, the HAP 140 may include a solar power generation system, such as a thin film photovoltaic surface included in the envelope 142. The solar power generation system may include solar panels and could be used to generate power that charges and/or is distributed by the power supply 342.

The payload 144 includes one or more processors 350 and on-board data storage (not shown in FIG. 3) including instructions which, when executed by the processors 350, cause the payload 144 to perform the operations described herein. The payload 144 also includes various sensors 340 that may be used to determine changes in position and orientation of the payload 144 and capture environmental data, and the payload 144 is configured to determine changes in position and orientation of the payload 144 (including, for example, changes in position and orientation of the RF feeder link antenna 146 and/or the telescope 382) based on at least sensor data obtained from the sensors 340. The sensors 340 may include, for example, one or more video and/or still cameras, a satellite positioning system (for example, GPS or GLONASS), various motion sensors (for example, accelerometers, gyroscopes, and/or compasses), a star field tracker for orientation estimation based on celestial objects, and environmental sensors operable to measure environmental data such as, but not limited to, pressure, altitude, temperature, relative humidity, and/or wind speed and/or direction.

The payload 144 includes an RF feeder communication system 360 that is configured to transmit and receive RF signals for the RF feeder links 130. The RF feeder communication system 360 includes a forward RF feeder link receiver 364 (labeled "RF RX" in FIG. 3) configured to receive multiple forward RF feeder links from the feeder RFT array 128. The RF feeder communication system 360 also includes a reverse RF feeder link transmitter 362 (labeled "RF TX" in FIG. 3) configured to concurrently transmit multiple reverse RF feeder links to respective feeder RFTs of the feeder RFT array 128. The RF feeder communication system 360 includes a beam orientation controller 366, which is configured to maintain the beams of the HAP-based RF feeder link antenna 146 in orientations toward their respective feeder RFTs 210 while the payload 144 moves around, such as by issuing commands to mechanical actuators and/or a phase array antenna.

The payload 144 also includes the optical feeder communication system 148 that is configured to transmit the forward optical feeder link 152 to the satellite 160 and receive the reverse optical feeder link 154 from the satellite 160. The optical feeder communication system 148 includes a steerable telescope 382 with an aperture 384. The optical feeder communication system 148 includes an forward optical feeder link transmitter 370 (labeled "OPTICAL TX" in FIG. 3) configured to generate the forward optical feeder link 152 from signals received via the RF feeder links 130. The optical feeder communication system 148 also includes an reverse optical feeder link receiver 372 (labeled "OPTI- CAL RX" in FIG. 3) configured to receive the reverse optical feeder link 154 and convert it into a signal suitable for generating portions of the RF feeder links 130.

The optical feeder communication system 148 also includes a PAT controller 380, which is configured to accurately and precisely perform optical pointing for the optical feeder link 150 between the payload 144 and the satellite 160 using commands to a pointing mechanism 336 for the telescope 382 while the payload 144 moves around. For example, the commands may be generated based on at least information received from the sensors 340 and/or optical sensing devices included in the optical feeder communication system 148 (such as, but not limited to, an optical quadrant detector and/or pixel-based optical detector receiving a portion of the reverse optical feeder link 154 via a beamsplitter). The pointing mechanism 336 may include multiple different actuators such as, but not limited to, a 2-D or 3-D gimbal for slow and coarse pointing of the telescope 382, and one or more steered optical elements (such as, but not limited to, two-axis steering of a low mass secondary optical element, such as a secondary reflector) that perform rapid and fine pointing of the optical feeder link 150. In some examples, the PAT controller 380 attempts to ensure that the satellite 160 (or an optical signal emitted by the satellite) remains in an FOV of the telescope 384, and rapidly adjusts a pointing angle of a low-mass secondary optical element to more precisely target the optical feeder link 150. In some implementations, the optical feeder communication system 148 may be configured to do wavefront correction of the optical feeder link 150 to counter atmospheric turbulence encountered by the optical feeder link 150. In some implementations, optical beam pointing may be performed in whole or in part by means of phased-array optics.

The HAP 140 may be configured for altitude control. For instance, the HAP 140 may include a variable buoyancy system, which is configured to change the altitude 330 of the HAP 140 by adjusting the volume and/or density of the gas in the envelope 142. A variable buoyancy system may take various forms and may generally be any system that can change the volume and/or density of gas in envelope 142. In some examples, the HAP 140 may include a propulsion system used to perform station keeping.

The telecommunication system 100 may include a navigation system for the HAP 140. The navigation system may implement station-keeping functions to maintain position within and/or move to a target position. In some examples, the navigation system may use altitudinal wind data to determine altitudinal adjustments that result in the wind carrying the HAP 140 in a desired direction and/or to a desired location. The altitude-control system may then make adjustments to the density of the envelope 140 in order to effectuate the determined altitudinal adjustments and cause the HAP 140 to move horizontally to the desired direction and/or to the desired location. The altitudinal adjustments may be computed by the HAP data center 126 and communicated to the HAP 140.

In some implementations, motion stabilization performed by the beam orienting controller 366 and/or the PAT controller 380 may be implemented using a Kalman filter utilizing sensor data, such as from the sensors 340, and a last-known motion vector for the payload 144 as inputs to the Kalman filter that could output a predicted relative location, pose, and control signals for stabilization to adjust the pointing axis based on the predicted relative location and/or pose. The Kalman filter could be performed many times per second. For instance, PAT controller 380 could control the pointing mechanism 336 for the telescope 382 to move from an initial axis towards a predicted target axis in an effort to compensate for motion of the payload 144 and to maintain the optical feeder link 150 with the satellite 160. The Kalman filter method could use as inputs various sensor data (e.g., GPS data, inertial navigation data, camera images, etc.) so as to generate predicted values. The system state predictions from the Kalman filter method may typically be more accurate than, for instance, utilizing data from only one sensor, as data from many types of sensors include noise, jitter, and generally imperfect sensor data.

The Kalman filter cycle could involve two main phases: a prediction phase and an update phase. In the prediction phase, the payload 144 could predict the current pose using a physical model of the payload 144, the HAP 140, and its environment plus any perturbations to other system variables, for instance, wind velocity, heading, and acceleration. Additionally, a covariance (a measure of how much two random variables, such as wind velocity and HAP 140 pose or payload 144 pose, change together) related to the predicted pose could be calculated. In the update phase, the payload 144 could receive GPS data or data relating to one or more RF feeder links 130 and/or the optical feeder link 150 indicating a degree to which they are accurately positioned. The positioning data could be used to update the initial predicted pose to obtain an updated pose. The predicted and updated poses could be used as inputs and weighted based on their associated covariances. The output of the Kalman filter method could provide a predicted pose that could be thus used to adjust the pointing angle of the RF feeder link antenna 146 or telescope 382 so as to maintain the RF feeder links 130 or the optical feeder link 150.

In some implementations, diversity may be provided by having multiple HAPs 140 and/or having multiple RF feeder terminal arrays 128 at multiple different sites. An optical fiber distribution network could be used to connect multiple diverse sites, each capable of serving the entire feeder link needs, and preferably offering sites with weather conditions that are generally uncorrelated with weather conditions at other sites. In general, only one station would be active at a time. Both the satellite and the ground network would be configured to coordinate the diversity switching operations. Determining the number and locations of the diverse sites would be a system engineering activity using cloud statistics from various weather satellites such as MODIS, AQUA, and TERRA. Research on climate change and weather forecasting has created a massive cloud database called the Global Energy and Water cycle Experiment (GEWEX) Cloud Assessment Database; such a database may be utilized for these determinations.

Figure 4:
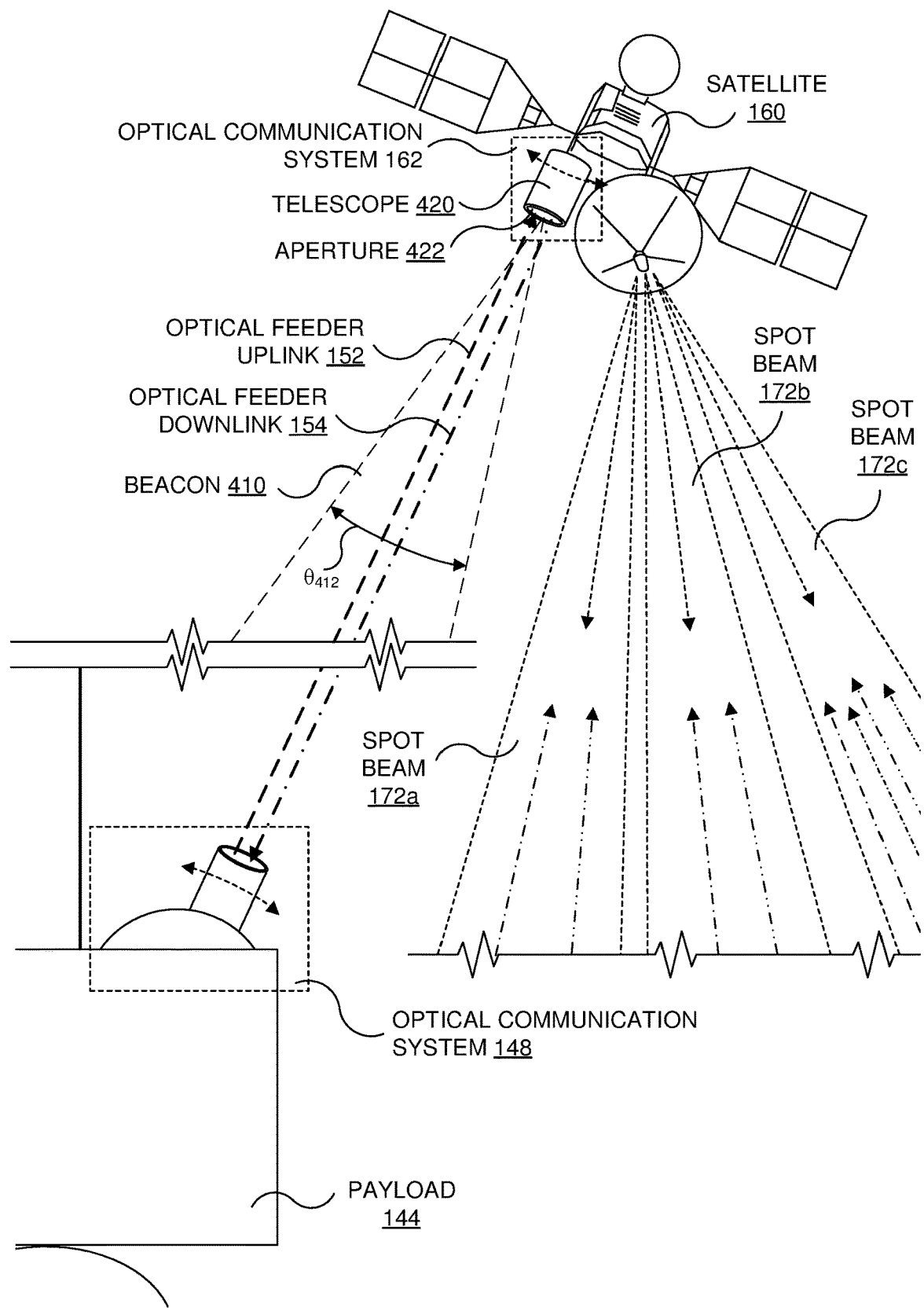
FIG. 4 illustrates further details of the satellite shown in FIG. 1 and examples of operations performed by the satellite in connection with the optical feeder link with the HAP 140 and the RF service links with end user RFTs.

FIG. 4 illustrates further details of the satellite 160 shown in FIG. 1 and examples of operations performed by the satellite 160 in connection with the optical feeder link 150 with the HAP 140 and the RF service links 170 with end user RFTs 112. In some examples, the satellite 160 is configured to transmit a beacon beam 410, with a higher divergence than the reverse optical feeder link 154 (for example, from about 1 milliradian to about 50 milliradians), which can be used by the optical feeder communication system 148 to more quickly acquire the optical feeder link 150 with the satellite 160. In some examples, the HAP 140 is also configured to transmit a beacon beam toward the satellite 160 to assist the optical feeder communication system 162 in more quickly acquiring the optical feeder link 150 with the HAP 140. The satellite-based optical feeder communication system 162 operates much as described for the HAP-based optical feeder communication 148, including performing steering of an optical telescope 420 with an aperture 422. As noted previously, as the satellite 160 does not undergo the degree and frequency of motion changes experienced by the platform 144, it is practical for telescope 420 to have a larger aperture 422 to increase gain for the optical feeder link 150. As the diameter of the reverse optical feeder link 154 is smaller than the range that the HAP 140 may operate, steering of the reverse optical feeder link 154 is required.

Although, as in FIG. 1, only three spot beams 172a, 172b, 172c are shown for the satellite 160, in many implementations there is a larger number of spot beams 172; for example, there may be hundreds or over one thousand spot beams 172.

Figure 5:
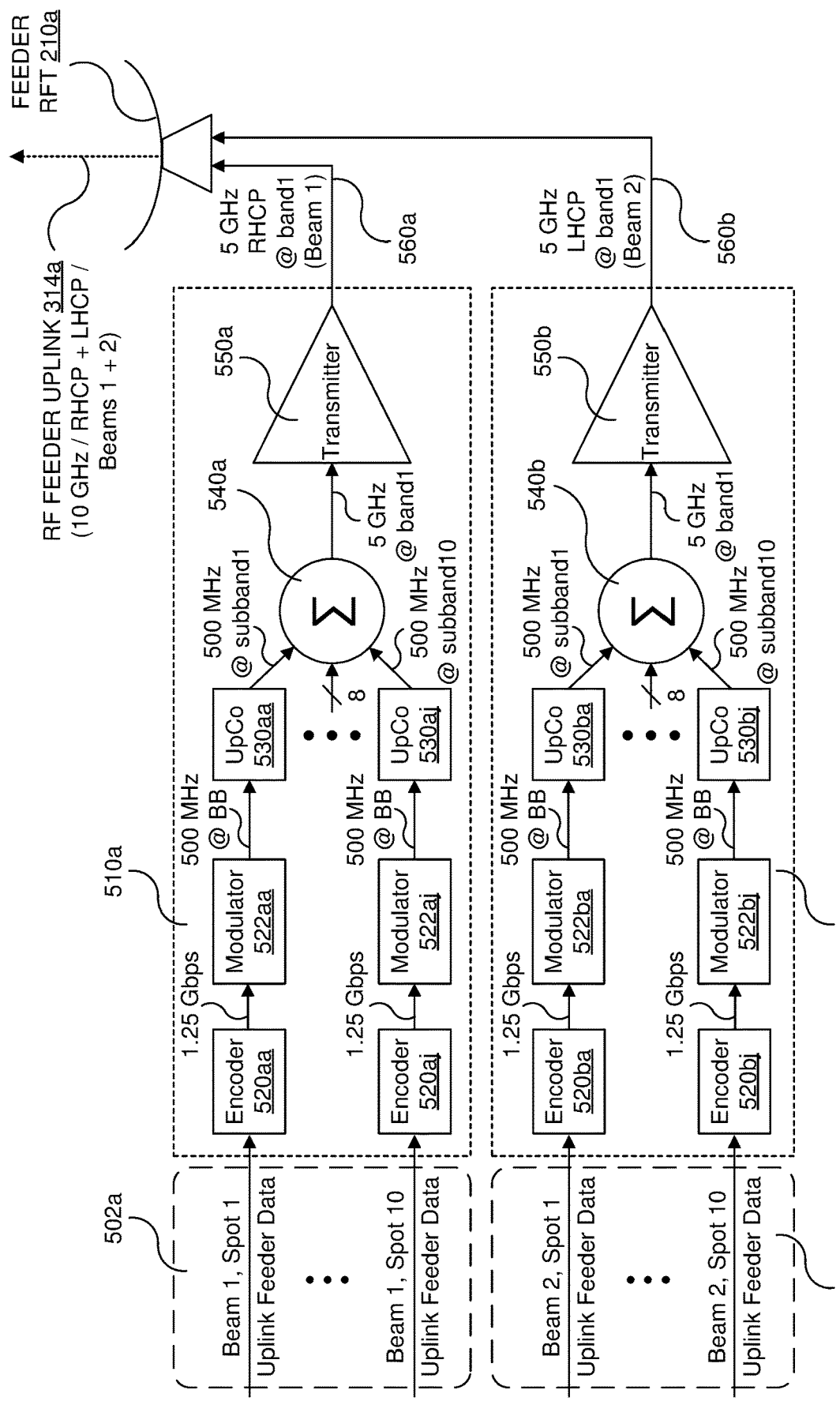
FIG. 5 illustrates an example of generating from network data a forward RF feeder link included in a high capacity set of forward RF feeder links, as may be performed under control of, and performed at least in part by, the HAP data center shown in FIGS. 1 and 2A.

FIG. 5 illustrates an example of generating from network data a forward RF feeder link included in a high capacity set of forward RF feeder links, as may be performed under control of, and performed at least in part by, the HAP data center 126 shown in FIGS. 1 and 2A. In this example, generation of one of the 40 forward RF feeder links, the forward RF feeder link 314a, is shown. This is performed in parallel and in real-time for each of the forward RF feeder links in the RF feeder links 130, resulting in a total of 1 Tbps of forward data capacity from the HAP data center 126 to the payload 144 of the HAP 140.

The HAP data center 126 receives from the gateway 120 a respective forward feeder link data stream for each of the spot beams 172. FIG. 5 shows the HAP data center 126 receiving 20 spot beam forward feeder link data streams. The HAP data center 126 is configured to multiplex upstream signals for multiple spot beams 172 into forward feeder link beam (which may also be referred to as a "forward feeder channel" or an "uplink feeder channel"). In the examples shown in FIGS. 5-7, a forward feeder link beam will not be demultiplexed into its constituent spot beams until it is received by the satellite 160. As shown in FIG. 5, two forward RF feeder link beams are generated for and concurrently transmitted by each active feeder RFT 210 in a respective forward RF feeder link 314. A first forward RF feeder link beam 560a (in FIG. 5, "Beam 1") is transmitted by a feeder RFT 210 (in FIG. 5, feeder RFT 210a) with right hand circular polarization (RHCP), and a second forward RF feeder link beam 560b (in FIG. 5, "Beam 2") is transmitted by the same feeder RFT 210 with left hand circular polarization (LHCP). The HAP data center 126 includes and operates a respective forward RF feeder link beam generator 510 for each of the forward RF feeder link beams 560. In FIG. 5, a first forward RF feeder link beam generator 510a receives 10 spot beam forward feeder link data streams 502a (labeled "Beam 1, Spot 1" through "Beam 1, Spot 10") and generates the corresponding first forward RF feeder link beam 560a for forward RF feeder link 314a, and a second forward RF feeder link beam generator 510b receives an additional 10 spot beam forward feeder link data streams 502b (labeled "Beam 2, Spot 1" through "Beam 2, Spot 10") and generates a corresponding second forward RF feeder link beam 560b for dual polarization forward RF feeder link 314a. In some examples, the RHCP and LHCP RF signals included in the forward RF feeder link 314a may be considered two separate forward RF feeder links transmitted by the same feeder RFT 210a.

The first forward RF feeder link beam generator 510a includes an encoder 520, a modulator 522, and an up-converter ("UpCo") 530 for each of the spot beam forward feeder link data streams 502a (for example, in FIG. 5, the first forward RF feeder link beam generator 510a includes 10 encoders 520aa through 520aj, 10 respective modulators 522aa through 522aj, and respective 10 up-converters 530aa through 530aj for the 10 respective spot beam forward feeder link data streams 502a). Each encoder 520 is configured to encode a respective spot beam forward feeder link data stream according to a selected forward error correction (FEC) technique, and a supported FEC may be performed according to one or more provided parameters (for example, an FEC rate). Each modulator 522 is configured to modulate its spot beam forward feeder link data stream according to a selected MODCOD scheme, and a supported MODCOD may be performed according to one or more provided parameters. The HAP data center 126 is configured to specify a FEC technique, a MODCOD scheme, and associated parameters, and the HAP data center 126 may choose the FEC technique, the MODCOD scheme, and/or parameters according to instructions received from the gateway 120. Different FEC techniques, MODCOD schemes, and/or parameters may be applied to spot beam forward feeder link data streams in the same forward feeder link beam. In some implementations, the HAP data center 126 may use DVB-S2X Adaptive Coding and Modulation to select which FEC and MODCOD is used. In this example, the FEC encoding results in 1.25 Gbps data streams, and the applied modulation has a spectral efficiency of 2.5 bits/Hz, resulting in a 500 MHz baseband signal for each of the spot beam forward feeder link data streams. With 800 spot beam forward feeder link data streams multiplexed into 80 forward feeder link beams, the 40 forward RF feeder links deliver 1 Tbps of total forward data capacity to the HAP 140.

Figure 6:
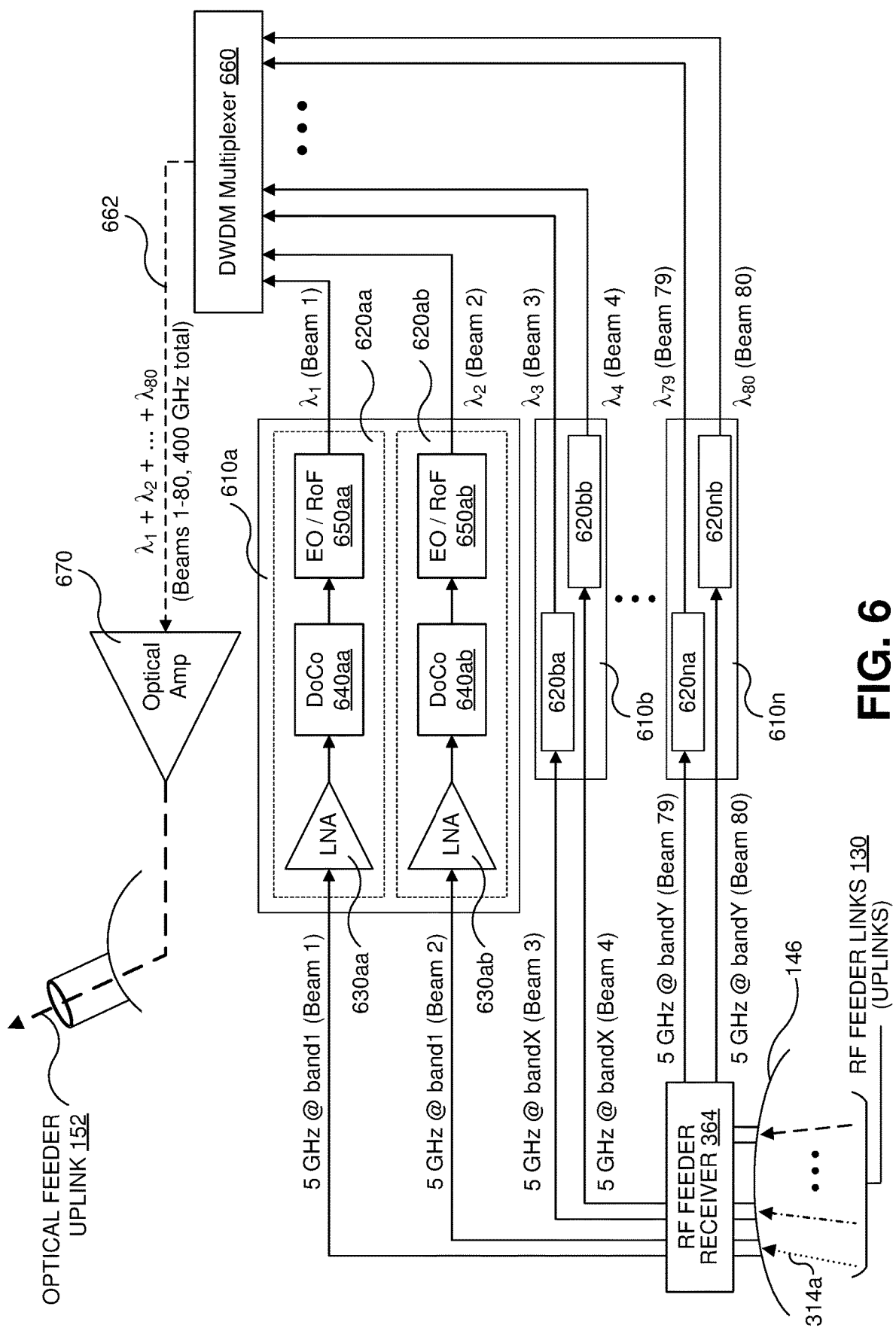
FIG. 6 illustrates an example of generating, at the HAP, the forward optical feeder link from the high capacity set of RF feeder links received from the feeder RFT array, including, for example, the forward RF feeder link shown in FIG. 5.

FIG. 6 illustrates an example of generating, at the HAP 140, the forward optical feeder link 152 from the high capacity set of RF feeder links 130 received from the feeder RFT array 128, including, for example, the forward RF feeder link 314a shown in FIG. 5. In this example, 80 forward RF feeder link beams are received via 40 forward RF feeder links, each forward RF feeder link beam is downconverted to a lower RF band (for example, with a downconverter, or "DoCo," such as downconverters 640aa and 640ab), and the downconverted RF signal is modulated onto a laser beam with an optical wavelength assigned to the forward feeder link beam (for example, Beam 1 is modulated onto an optical beam with wavelength $\lambda_1$, Beam 2 at wavelength $\lambda_2$, and so on) using an electrical to optical (EO) converter (for example, by applying radio over fiber, or "RoF," techniques, such as with EO converters 650aa and 650bb). In some examples, a Mach Zehnder Modulator is used for the electrical to optical modulation. In some implementations, as shown in FIG. 6, each beam is assigned to a respective WDM channel (for example, a DWDM channel) with a respective wavelength. In some implementations, multiple beams may be downconverted to different frequencies and together be assigned to a WDM channel; for example, Beams 1 and 2 could be modulated onto an optical beam with a first wavelength, Beams 3 and 4 modulated onto an optical beam with a different second wavelength, and so on. ITU-T G.694.1 defines a DWDM spectral grid for the ITU C-, L-, and S-bands with channel spacings ranging from 12.5 GHz to 100 GHz. For example, with 50 GHz channel spacing, the ITU C-band and the ITU L-band can each be used to provide 100 channels. Use of different wavelength bands may permit a duplex optical transceiver that transmits in one of the C-, S-, or L-band and receives in a different one of the C-, S-, or L-band. A WDM multiplexer 660 combines the 80 optical signals into a single multiplexed optical signal 662, which is provided to an optical amplifier 670, such as a doped fiber amplifier (for example, a Erbium, Ytterbium, or Thulium-doped fiber amplifier), tapered amplifier, semiconductor optical amplifier, Raman amplifier, and/or a parametric amplifier to produce the forward optical feeder link 152 for transmission to the satellite 160. In some implementations, optical amplification may be performed before WDM multiplexing. The multiplexed forward optical feeder link 152 uses 80 WDM channels, each used to carry 5 GHz of capacity, for a total of 400 GHz of bandwidth providing 1 Tbps forward data capacity.

Figure 7:
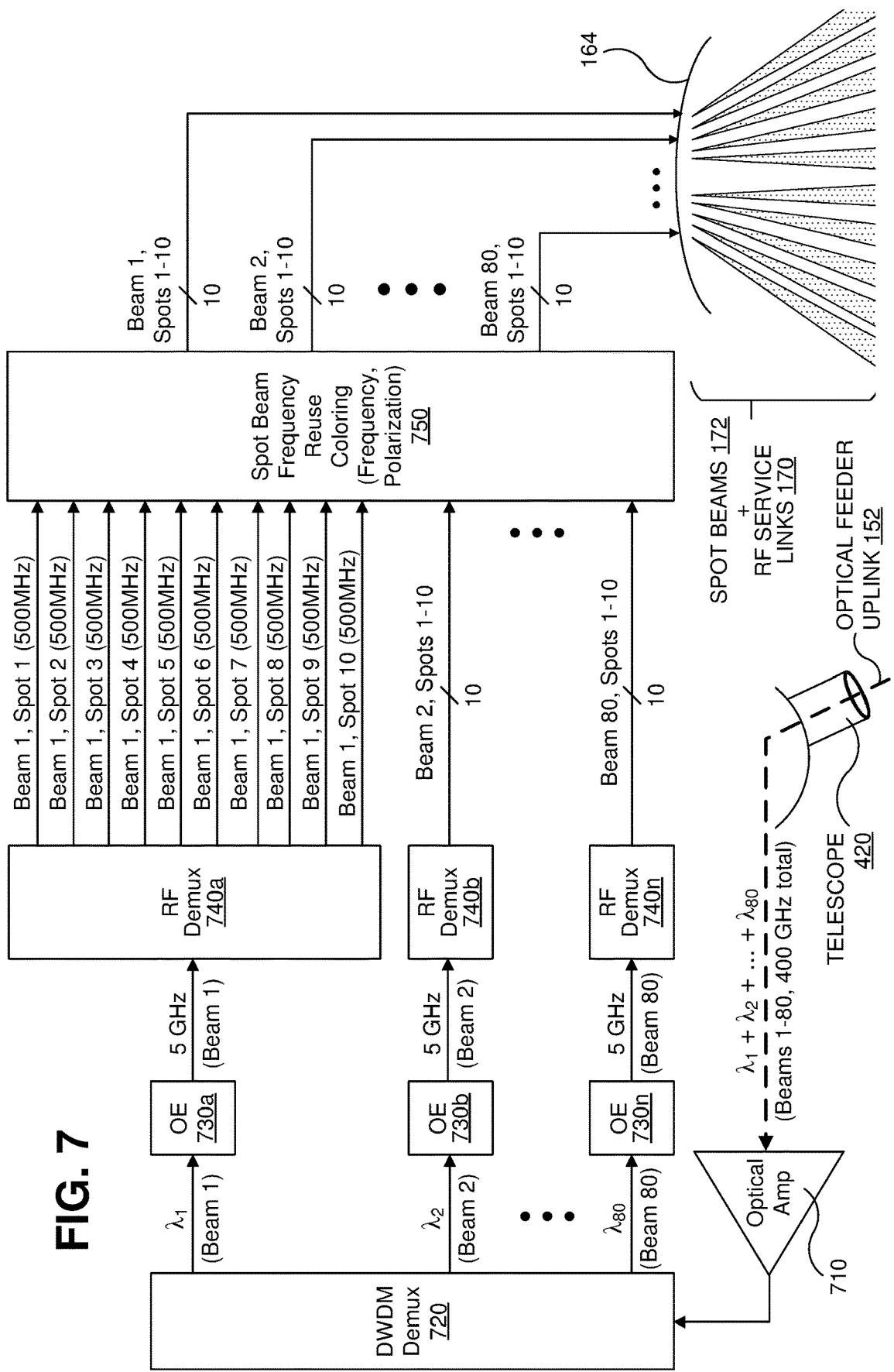
FIG. 7 illustrates an example of the satellite shown in FIGS. 1 and 4 converting the forward optical feeder link received from the HAP into corresponding RF service links for multiple spot beams.

FIG. 7 illustrates an example of the satellite 160 shown in FIGS. 1 and 4 converting the forward optical feeder link 152 received from the HAP 140 into corresponding RF service links 170 for multiple spot beams 172. First, the received WDM forward optical feeder link 152 is amplified by an optical amplifier 710 to an optical power level of at least 100 mW. The resulting amplified WDM forward optical feeder link 152 is provided to a WDM demultiplexer 720, which is configured to demultiplex the amplified forward optical feeder link 152 into its constituent WDM channels (which may be referred to as "optical channel signals") with respective wavelengths $\lambda_1, \lambda_2, \ldots \lambda_{80}$. As shown in more detail for the wavelength $\lambda_1$, the WDM channels for each of the wavelengths $\lambda_1$-$\lambda_{80}$ are converted into demultiplexed RF spot beam signals similar to those output by the modulators 522 in FIG. 5. The demultiplexed RF spot beam signals are "colored" for frequency reuse by upconverting them to appropriate frequencies (for example, frequencies in the Ka-, Ku-, and/or Q-bands) and applying either right hand circular polarization or left hand circular polarization. The resulting RF spot beam signals are transmitted by the satellite-based RF communication system 164 as forward RF service links 176 via the spot beams 172 of the RF service links 170 for receipt, demodulation, and decoding to retrieve the data originally provided in the spot beam forward feeder link data streams to the forward RF feeder link beam generators 510 of the HAP data center 126.

The examples shown in FIGS. 5-7 illustrate essentially an "analog transparent architecture" or "bent-pipe architecture," in which the modulation and coding initially transmitted by the feeder RFT array 128 in the forward direction, or initially transmitted by the end-user satellite RFTs 112 in the reverse direction, is not changed by the HAP 140 or the satellite 160. This allows for changes in modulation schemes to be employed in both the forward and reverse directions without changes to the hardware of the HAP 140 or the satellite 160 and allows the HAP data center 126 to implement technologies such as ground-based beam forming or other precoding techniques.

However, regenerative retransmission techniques can be performed at the HAP and/or satellite, in which received signals are demodulated, error corrected, and remodulated (in some instances with a different modulation scheme than in the received signal). A drawback of regenerative retransmission is a substantial power requirement at terabit per second data rates on platforms with limited power and already substantial power requirements.

Figure 8:
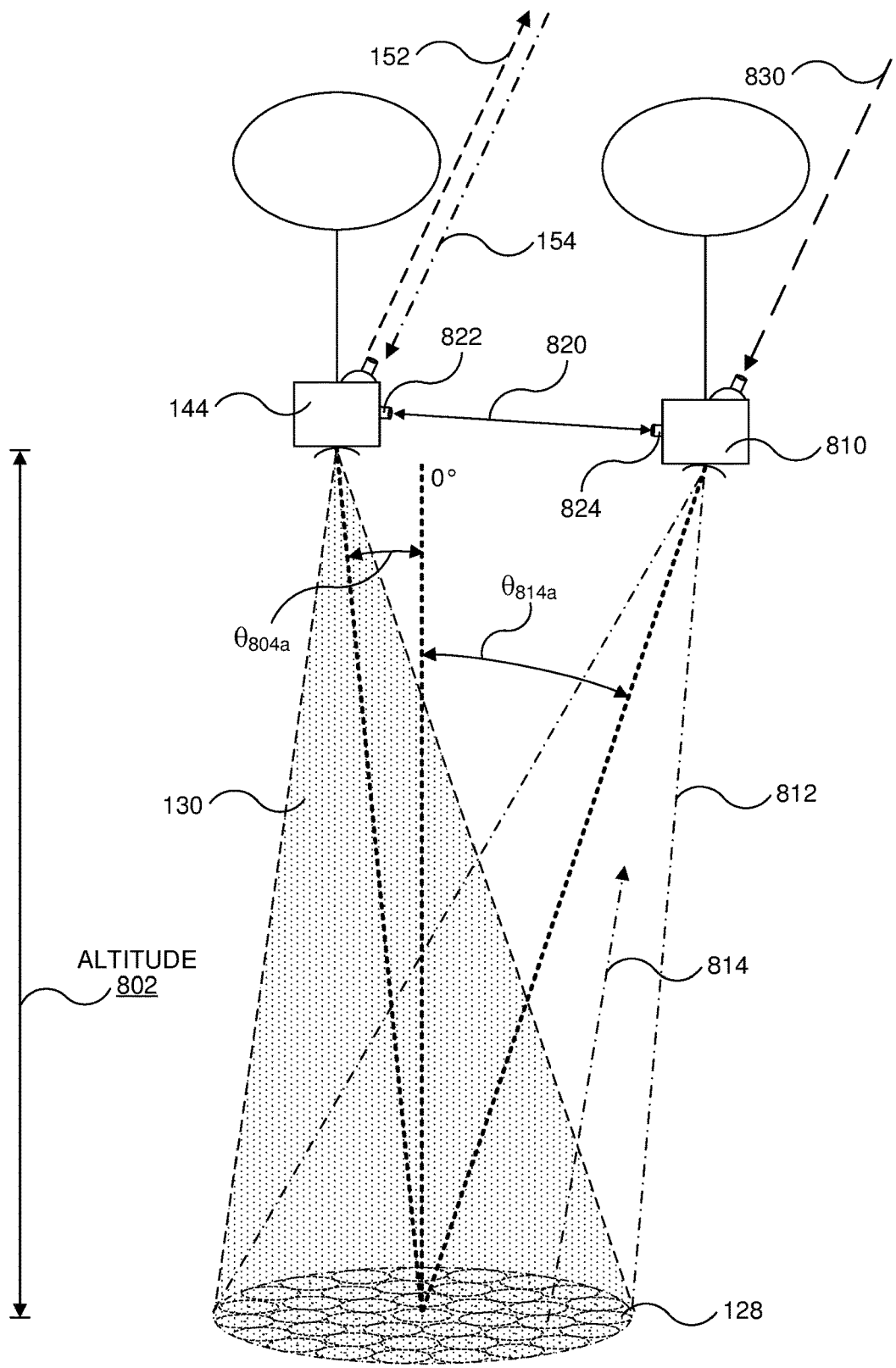
FIGS. 8-10 illustrate examples of station-keeping and handover operations performed among a plurality of HAPs being operated as part of a telecommunication system, as described for the HAP in FIGS. 1, 3, 5, and 6.
Figure 9:
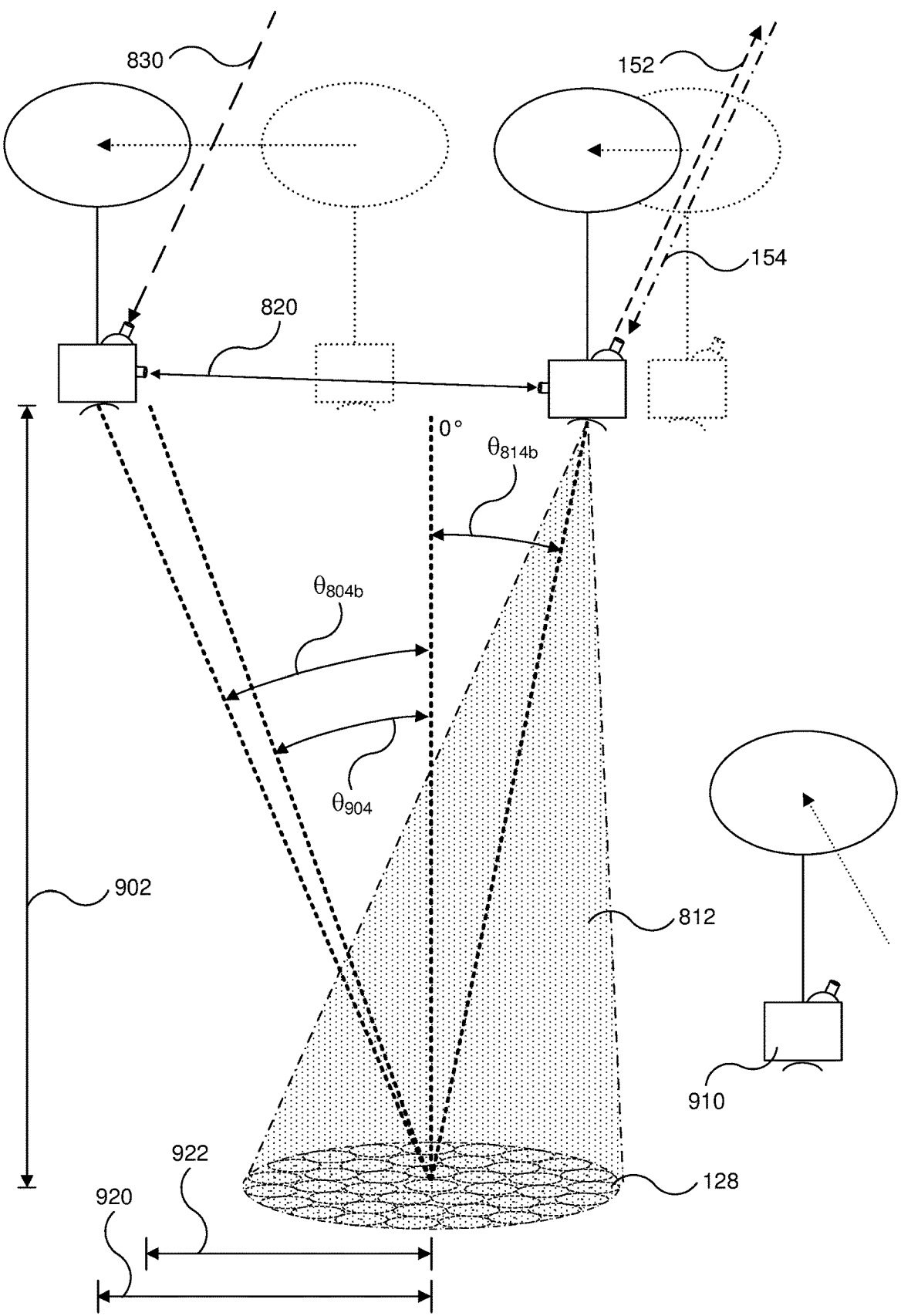
Figure 10:
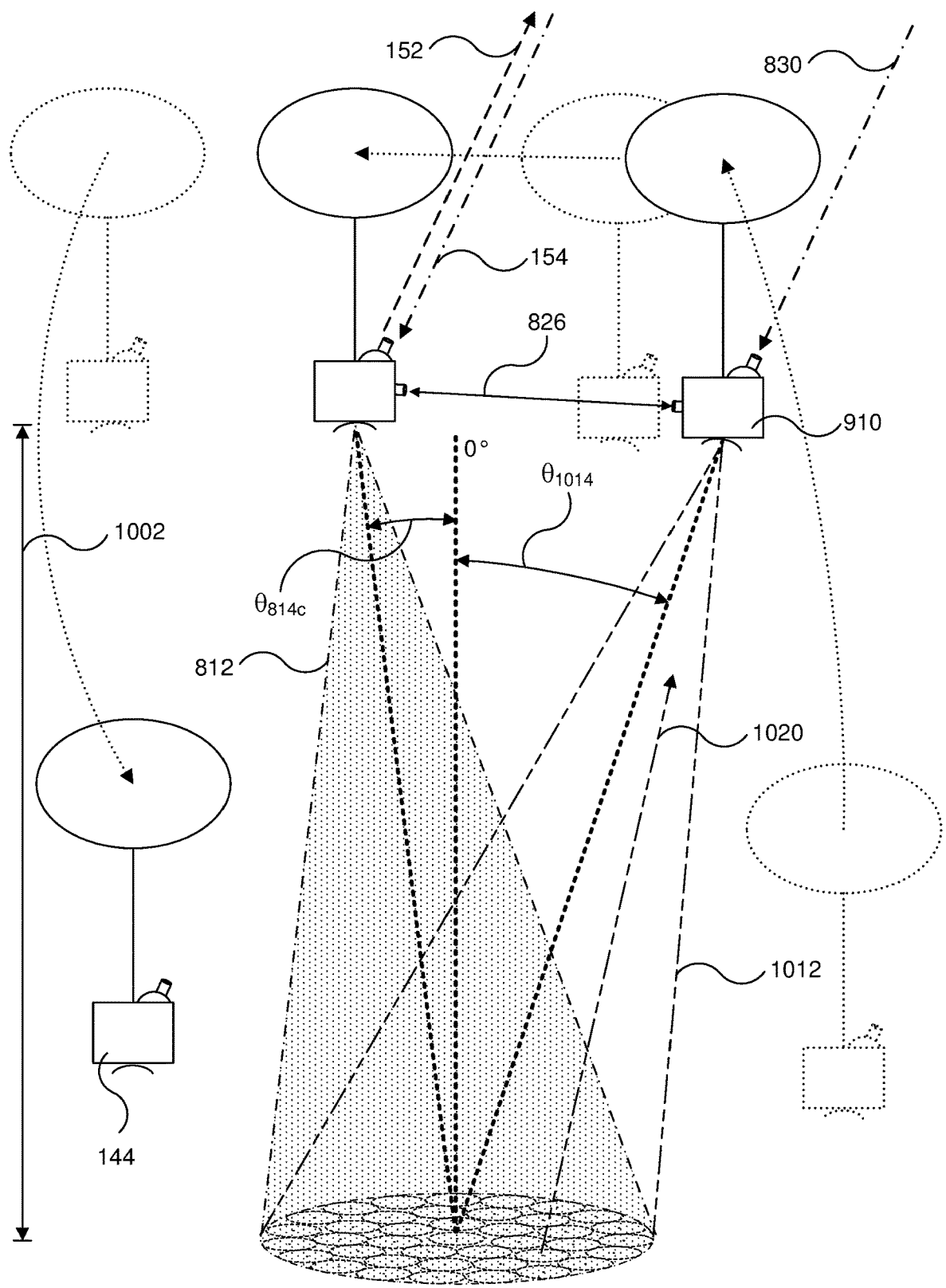

FIGS. 8-10 illustrate examples of station-keeping and handover operations performed among a plurality of HAPs being operated as part of the telecommunication system 100, as described for the HAP 140 in FIGS. 1, 3, 5, and 6. Issues such as a leaking or torn envelope 142 or unscheduled repairs can unexpectedly take a currently operating HAP out of service with little to no notice. Additionally, HAPs may be returned to earth periodically for routine maintenance and hardware or software upgrades.

In FIG. 8, a first HAP payload 144 and a second HAP payload 810 are operating at approximately a first altitude 802 in proximity to the feeder RFT array 128, with the first HAP payload 144 at a first zenith distance $\theta_{804a}$ relative to the feeder RFT array 128, and the second HAP payload 810 at a second zenith distance $\theta_{814a}$. The first HAP payload 144 is operating RF service links 130 at their full capacity and operating corresponding forward optical feeder link 152 and reverse optical feeder link 154 with the satellite 160. To be prepared to handover the operations of the first HAP payload 144 to the second HAP payload 810, the optical feeder communication system of the second HAP payload 810 is performing PAT of the satellite 160 by use of an optical beacon signal 830 transmitted by the satellite 160, and the RF feeder communication system of the second HAP payload 810 is tracking the feeder RFT array 128 via RF transmissions by one or more feeder RFTs 210 included in the feeder RFT array 128. Additionally, via optical communication terminals 822 and 824 in respective HAP payloads 144 and 810, a bidirectional optical link is established and maintained between the HAP payloads 144 and 810.

FIG. 9 illustrates an example in which a handover operation is performed from the first HAP payload 144 to the second HAP payload 810. In this example, the first HAP payload 144 is at an altitude 902 and an increased horizontal distance 920 from the feeder RFT array 128, with the first HAP payload 144 being at an increased third zenith distance $\theta_{804b}$ relative to the feeder RFT array 128. The second HAP payload 810 is at a fourth zenith distance $\theta_{814b}$ that allows it to operate the RF feeder links 130 at their full capacity. Thus, a handoff operation is performed from the first HAP payload 144 to the second HAP payload 810, in which the feeder RFT array 128 establishes new RF feeder links with the second HAP payload 810, and the second HAP payload 810 operates the optical feeder links 152 and 154 with the satellite. With the second HAP payload 810 having made preparations to service as a "hot spare" as shown in FIG. 8, this handoff may be performed with very little interruption in service between the feeder RFT array 128 and the satellite 160. The first HAP payload 144 may perform operations to be prepared as a "hot spare," including performing PAT of the optical beacon 830, in the event that the first HAP payload 144 ends up in a position suitable for that purpose. In some circumstances, a third HAP payload 910 may be launched, whether in response to the handover, a prediction of the handover, or other considerations for operation of a fleet of HAPs, to eventually operate as a "hot spare" as done by the second HAP payload 810 in FIG. 8.

FIG. 10 illustrates an example arrangement of the fleet of three HAP payloads 144, 810, and 910 after FIG. 9. In FIG. 10, the first HAP payload 144 is returning to the surface for maintenance and/or refueling, and is no longer making efforts to operate as a "hot spare." Additionally, the third HAP payload 910 has reached a position in which it is able to operate as a "hot spare." Accordingly, the second HAP payload 810 and the third HAP payload 910 have effectively assumed the roles previously shown for the first HAP payload 144 and the second HAP payload 810 respectively in FIG. 8.

FIGS. 11A-D illustrate examples in which the RF feeder links 130 are operated with degradation in capacity in accordance with a zenith distance and azimuth of the HAP 140 relative to the feeder RFT array 128. Such graceful degradation in capacity may be useful in circumstances in which a HAP currently providing all, or a significant portion, of the capacity has moved away from the feeder RFT array 128, but there is not another HAP immediately available to fully handover to. In FIG. 11A, the HAP 140 is at a fifth zenith distance $\theta_{1110}$ similar to the first zenith distance $\theta_{804a}$ shown for the first HAP payload 144 in FIG. 8. FIG. 11A includes an azimuth indicator 1114 to more conveniently illustrate a first azimuth $\theta_{1112}$ of the HAP 140 with respect to the feeder RFT array 128 (which has the arrangement of 61 feeder RFTs 210 illustrated in FIG. 2C). At the fifth zenith distance $\theta_{1110}$, a small portion of the feeder RFTs 210 opposite the azimuth indicator 1114 are at too oblique of an angle from the viewpoint of the HAP 140 for that portion of feeder RFTs 210 to be operated without RF interference between them. For example, at the fifth zenith distance $\theta_{1110}$, if feeder RFTs 210*h* and 210*i* are both active, there will be an unacceptable amount of RF interference between their respective RF feeder links, and if feeder RFTs 210*i* and 210*j* are both active, there will be an unacceptable amount of RF interference between their respective feeder links. This will cause the signal-to-noise plus interference ratio (SINR) to decrease for each of the forward and reverse RF feeder links for those feeder RFTs 210. In response to this, 5 feeder RFTs 210 (including the feeder RFT 210*i*) that were previously operating RFT feeder links 130 are disabled or otherwise removed from the RFT feeder links 130 between the HAP 140 and the feeder RFT array 128. As a result, RF interference between the active RF feeder links 130 is avoided; for example, feeder RFTs 210*h* and 210*j* can both remain active without interfering with each other.

In FIG. 11B, the HAP 140 has moved to a position with an increased sixth zenith distance $\theta_{1120}$, and in response a total of 13 of the feeder RFTs 210 (including a feeder RFT 210*k*) have been disabled to allow their neighboring feeder RFTs to operate as RF feeder links 130 with the HAP 140 without interference. In FIG. 11C, the HAP 140 has advanced to another position to a further increased seventh zenith distance $\theta_{1130}$, and in response a total of 28 of the feeder RFTs 210 (including a feeder RFT 210*m*) have been disabled. At this point, the RF feeder links 130 are performing at roughly half of their full capacity, depending on the margins offered by the full set of 61 feeder RFTs 210 (as this may provide excess capacity to absorb such degradation to a certain degree). In FIG. 11D, the HAP 140 as advanced to another position, with an eighth zenith distance $\theta_{1140}$ similar to the seventh zenith distance $\theta_{1130}$ in FIG. 11C, but at a much different second azimuth $\theta_{1142}$. Although a same number of feeder RFTs 210 are disabled (including a feeder RFT 210*n*) as in FIG. 11C, the selection of the disabled RFTs 210 is responsive to the second azimuth $\theta_{1142}$.

In some implementations, the RF feeder links 130 are operated with degradation in capacity in accordance with a zenith distance and azimuth of the HAP 140 relative to the feeder RFT array 128. For example, in an alternative compact arrangement of the 61 feeder RFTs 210 shown in FIGS. 2C and 11A-11D, with the RFT cells 212 for the 61 feeder RFTs (referred to as "central feeder RFTs") arranged hexagonally, the feeder RFT array 128 includes an additional 18 spare feeder RFTs positioned around the periphery of the central feeder RFTs. When the HAP 140 is positioned directly above the feeder RFT array 128 with this alternative compact arrangement, the central feeder RFTs are in active operation, with respective RF feeder links 130 established with the HAP 140, and the spare feeder RFTs are inactive. This arrangement of active and inactive central feeder RFTs and spare feeder RFTs may be used while the zenith distance and azimuth of the HAP 140 does not result in an unacceptable amount of interference occurring between neighboring RFTs 210.

Continuing with the alternative compact arrangement of the central and spare feeder RFTs, with the HAP 140 at a ninth zenith distance similar to the fifth zenith distance $\theta_{1110}$ shown in FIG. 11A and at a third azimuth similar to the first azimuth $\theta_{1112}$ shown in FIG. 11A, much as in FIG. 11A, a small portion of the central feeder RFTs opposite the HAP 140 are at too oblique of an angle from the viewpoint of the HAP 140 for that portion of the central feeder RFTs to be operated without RF interference between them. In response to this, 11 of the central feeder RFTs, positioned to the right of a line are selectively deactivated, and 11 (the same number, if available, and to the left of the line) of the spare feeder RFTs are selectively activated with respective RF feeder links 130 operated with the HAP 140, with the remaining central feeder RFTs remaining active and the remaining spare feeder RFTs remaining inactive. The arrangement of active and inactive central and spare RFTs is determined based on at least the ninth zenith distance and/or the third azimuth of the HAP 140. Additionally, in response to a central feeder RFT being deactivated for maintenance or repair, a spare RFT may be activated to maintain a total number of RF feeder links 130.

It is noted that although above FIGS. 11A-11D and the alternative compact arrangement of the central and spare feeder RFTs are described in terms of feeder RFTs 210 being in active or inactive states, other changes in operation of the feeder RFT array 128 and the RFT feeder links 130 may be performed in response to changes in the zenith distance and/or the azimuth of the HAP 140 with respect to the feeder RFT array 128. Such changes may also involve the selection of feeder RFTs 128 in arrangements similar to those described for FIGS. 11A-11D and the alternative compact arrangement of the central and spare feeder RFTs. For example, encoding and/or modulation parameters may be changed to increase the error protection on interfering RF feeder links. This will maintain the error rate at an acceptable level at a cost of reducing the efficiency and data throughput of those RF feeder links. As the error increases, the total data throughput for the active RF feeder links 130 may become unacceptably low (for example, falling below a threshold value). In such cases, portions of the feeder RFTs 210 may be selectively deactivated and/or activated as described for 11A-11D and the alternative compact arrangement of the central and spare feeder RFTs. In part, these changes, and the changes described in FIGS. 11A-11D and for the alternative compact arrangement of the central and spare feeder RFTs, may be performed in response to closed loop signal quality monitoring.

Figure 12A:
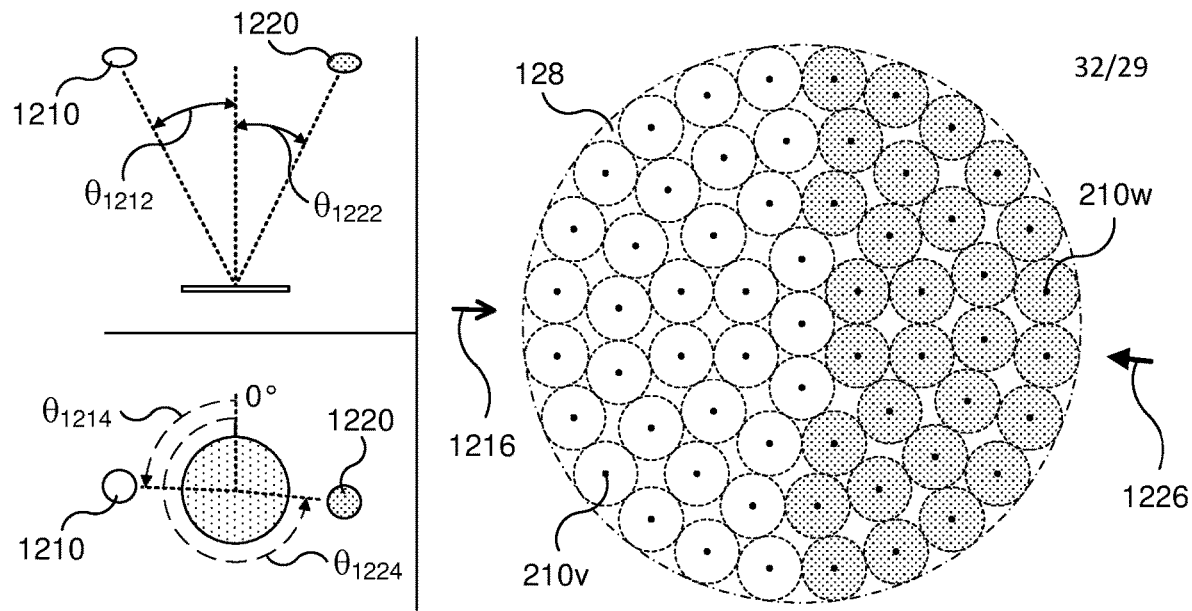
FIGS. 12A and 12B show other approaches in which degraded capacity can be provided between a HAP and a feeder RFT array, but in which other HAPs pick up the remaining capacity.
Figure 12B:
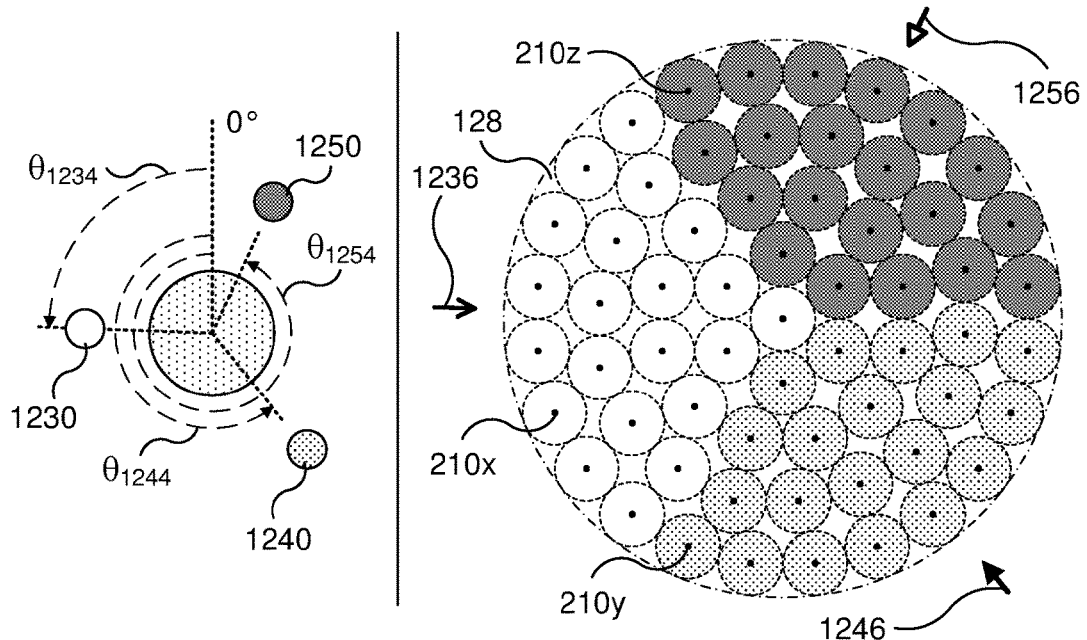

FIGS. 12A and 12B show other approaches in which degraded capacity can be provided between a HAP and the feeder RFT array 128, but in which other HAPs pick up the remaining capacity. In FIG. 12A, there are first and second HAPs 1210 at respective tenth and eleventh zenith distances $\theta_{1212}$ and $\theta_{1222}$, which are both approximately the same as the fifth zenith distance $\theta_{1100}$ in FIG. 11A, and are at respective fourth and fifth azimuths $\theta_{1214}$ and $\theta_{1224}$ (with corresponding azimuth indicators 1216 and 1226). The feeder RFTs 210 of the feeder RFT array 128 are all active, with the telecommunication system 100 being configured to associate each RF feeder link 130 with either the first HAP 1210 or the second HAP 1220 based on their respective tenth and eleventh zenith distances $\theta_{1212}$ and $\theta_{1222}$ and their respective fourth and fifth azimuths $\theta_{1214}$ and $\theta_{1224}$. In this example, 32 of the feeder RFTs 210 (including a feeder RFT 210*s*) are linked with the first HAP 1210, and the remaining 29 of the feeder RFTs 210 (including a feeder RFT 210*t*) are linked with the second HAP 1220. An optical link between the first and second HAPs 1210 and 1220 may be used to relay feeder data between the two HAPs 1210 and 1220 while operating only a single optical feeder link between a satellite and just one of the HAPs 1210 and 1220. With this arrangement, FIG. 12B illustrates a similar example involving three HAPs 1230, 1240, and 1250 with active RF feeder links 130 with the feeder RFT array 128. In FIG. 12B, the three HAPs 1230, 1240, and 1250 are at respective sixth, seventh, and eighth azimuths $\theta_{1234}$, $\theta_{1244}$, and $\theta_{1254}$ (with corresponding azimuth indicators 1236, 1246, and 1256). The feeder RFTs 210 of the feeder RFT array 128 are all active, with the telecommunication system 100 being configured to associate each RF feeder link 130 with one of the HAPs 1230, 1240, and 1250 based on their respective zenith distances (not shown in FIG. 12B) and their respective sixth, seventh, and eighth azimuths $\theta_{1234}$, $\theta_{1244}$, and $\theta_{1254}$. In this example, 21 of the feeder RFTs 210 (including a feeder RFT 210u) are linked with the HAP 1230, 20 of the feeder RFTs 210 (including a feeder RFT 210v) are linked with the HAP 1240, and the remaining 20 of the feeder RFTs 210 (including a feeder RFT 210w) are linked with the HAP 1250.

U.S. Pat. No. 6,327,063 (entitled "Reconfigurable Laser Communications Terminal" and issued on Dec. 4, 2001), U.S. Pat. No. 9,723,386 (entitled "Communication Device" and issued on Aug. 1, 2017); and US Patent Application Publication Numbers 2003/0213872 (entitled "High altitude platform control system" and published on Nov. 20, 2003), 2013/0177321 (entitled "Balloon Network with Free-Space Optical Communication between Super-Node Balloons and RF Communication between Super-Node and Sub-Node Balloons" and published on Jul. 11, 2013), 2013/0177322 (entitled "Establishing Optical-Communication Lock with Nearby Balloon" and published on Jul. 11, 2013), 2013/0179008 (entitled "USING PREDICTED MOVEMENT TO MAINTAIN OPTICAL-COMMUNICATION LOCK WITH NEARBY BALLOON" and published on Jul. 11, 2013), 2014/0085135 (entitled "Balloon-Based Positioning System and Method" and published on Mar. 27, 2014), 2015/0063159 (entitled "Re-tasking Balloons in a Balloon Network Based on Expected Failure Modes of Balloons" and published on Mar. 5, 2015), 2015/0244458 (entitled "OPTICAL COMMUNICATION TERMINAL" and published on Aug. 27, 2015), 2015/0270890 (entitled "APPARATUS AND METHOD FOR NETWORK LEVEL SYNCHRONIZATION IN MULTIPLE LOW EARTH ORBIT (LEO) SATELLITE COMMUNICATIONS SYSTEMS" and published on Sep. 24, 2015), 2015/0271730 (entitled "APPARATUS AND METHOD FOR EFFICIENT HANDOVER FOR LOW EARTH ORBIT (LEO) SATELLITE SYSTEMS" and published on Sep. 24, 2015), 2015/0318916 (entitled "SYSTEM AND ARCHITECTURE FOR SPACE-BASED AND MOBILE TERRESTRIAL SENSOR VEHICLES, AND END-TO-END NETWORK FOR AGGREGATION AND PROCESSING OF SENSOR DATA" and published on Nov. 5, 2015), 2016/0037434 (entitled "CENTRALIZED GROUND-BASED ROUTE DETERMINATION AND TRAFFIC ENGINEERING FOR SOFTWARE DEFINED SATELLITE COMMUNICATIONS NETWORKS" and published on Feb. 4, 2016), 2016/0105806 (entitled "MULTIBEAM COVERAGE FOR A HIGH ALTITUDE PLATFORM" and published on Apr. 14, 2016), 2016/0204865 (entitled "LINK ARCHITECTURE AND SPACECRAFT TERMINAL FOR HIGH RATE DIRECT TO EARTH OPTICAL COMMUNICATIONS" and published on Jul. 14, 2016), 2016/0211908 (entitled "HIGH ALTITUDE PLATFORM WITH MULTI-BEAM COVERAGE FOR AERO-BASED TERMINALS" and published on Jul. 21, 2016), 2017/0085411 (entitled "MODULATION AND CODING FOR A HIGH ALTITUDE PLATFORM" and published on Mar. 23, 2017), 2017/0272131 (entitled "Interference Mitigation Systems in High Altitude Platform Overlaid With a Terrestrial Network" and published on Sep. 21, 2017), 2017/0294957 (entitled "HYBRID SATELLITE SYSTEMS FOR ENHANCED PERFORMANCE AND ENHANCED QUALITY OF SERVICE BROADBAND COMMUNICATIONS" and published on Oct. 12, 2017), 2018/0074208 (entitled "SYSTEM AND METHOD FOR EFFICIENT BROADCAST OF SATELLITE CONSTELLATION EPHEMERIS INFORMATION" and published on Mar. 15, 2018), 2018/0084476 (entitled "RADIO RESOURCE MANAGEMENT AND ROUTING FOR FIXED DATA CIRCUITS IN AN NGSO SATELLITE DATA COMMUNICATIONS SYSTEM" and published on Mar. 22, 2018), 2018/0098247 (entitled "MULTI-MODEM USER TERMINAL AND POLICY-BASED MANAGEMENT FOR SATELLITE TRANSPORT RESILIENCY" and published on Apr. 5, 2018), 2018/0160373 (entitled "METHODS FOR UPLINK POWER CONTROL TO COMBAT RAIN FADE IN WIDEBAND SATELLITE SYSTEMS" and published on Jun. 7, 2018), 2018/0191431 (entitled "EFFICIENT AUTOMATIC REPEAT REQUEST FOR FREE SPACE OPTICAL COMMUNICATION" and published on Jul. 5, 2018), and 2018/0192298 (entitled "METHOD AND SYSTEM FOR ORIENTING A PHASED ARRAY ANTENNA" and published on Jul. 2, 2018), 2018/0234284 (entitled "MODULATION AND CODING FOR A HIGH ALTITUDE PLATFORM" and published on Aug. 16, 2018), each of which are incorporated by reference herein in their entireties.

The detailed examples of systems, devices, and techniques described in connection with FIGS. 1-12B are presented herein for illustration of the disclosure and its benefits. Such examples of use should not be construed to be limitations on the logical process implementations of the disclosure, nor should variations of user interface methods from those described herein be considered outside the scope of the present disclosure. In some implementations, various features described in FIGS. 1-12B are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In implementations in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a communication network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

Figure 13:
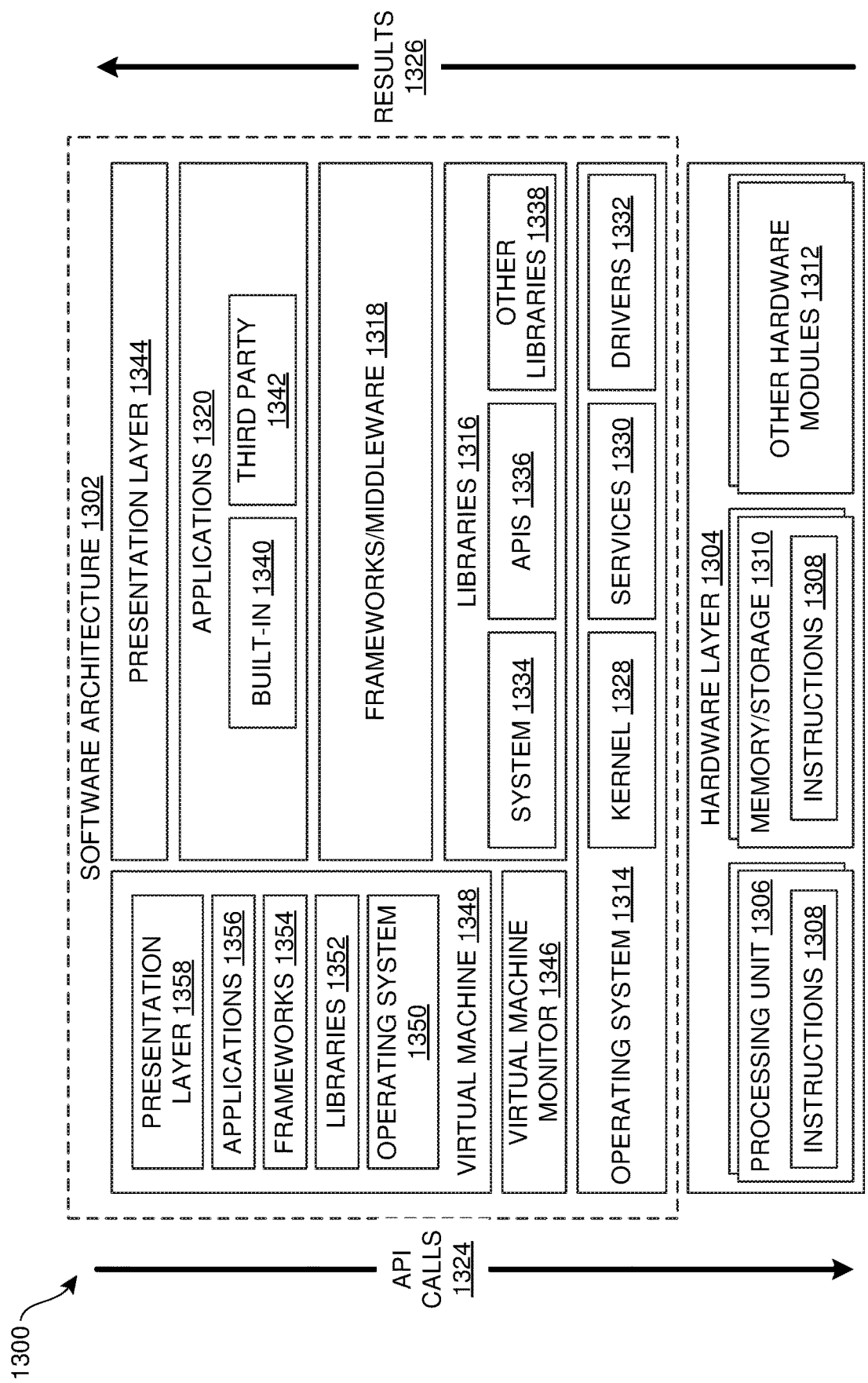
FIG. 13 is a block diagram illustrating an example software architecture, various portions of which may be used in conjunction with various hardware architectures herein described, which may implement any of the described features.

FIG. 13 is a block diagram 1300 illustrating an example software architecture 1302, various portions of which may be used in conjunction with various hardware architectures herein described, which may implement any of the above-described features. FIG. 13 is a non-limiting example of a software architecture and it will be appreciated that many other architectures may be implemented to facilitate the functionality described herein. A representative hardware layer 1304 includes a processing unit 1306 and associated executable instructions 1308. The executable instructions 1308 represent executable instructions of the software architecture 1302, including implementation of the methods, modules and so forth described herein. The hardware layer 1304 also includes a memory/storage 1310, which also includes the executable instructions 1308 and accompanying data. The hardware layer 1304 may also include other hardware modules 1312. Instructions 1308 held by processing unit 1308 may be portions of instructions 1308 held by the memory/storage 1310.

The example software architecture 1302 may be conceptualized as layers, each providing various functionality. For example, the software architecture 1302 may include layers and components such as an operating system (OS) 1314, libraries 1316, frameworks 1318, applications 1320, and a presentation layer 1324. Operationally, the applications 1320 and/or other components within the layers may invoke API calls 1324 to other layers and receive corresponding results 1326. The layers illustrated are representative in nature and other software architectures may include additional or different layers. For example, some mobile or special purpose operating systems may not provide the frameworks/middleware 1318.

The OS 1314 may manage hardware resources and provide common services. The OS 1314 may include, for example, a kernel 1328, services 1330, and drivers 1332. The kernel 1328 may act as an abstraction layer between the hardware layer 1304 and other software layers. For example, the kernel 1328 may be responsible for memory management, processor management (for example, scheduling), component management, networking, security settings, and so on. The services 1330 may provide other common services for the other software layers. The drivers 1332 may be responsible for controlling or interfacing with the underlying hardware layer 1304. For instance, the drivers 1332 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1316 may provide a common infrastructure that may be used by the applications 1320 and/or other components and/or layers. The libraries 1316 typically provide functionality for use by other software modules to perform tasks, rather than rather than interacting directly with the OS 1314. The libraries 1316 may include system libraries 1334 (for example, C standard library) that may provide functions such as memory allocation, string manipulation, file operations. In addition, the libraries 1316 may include API libraries 1336 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1316 may also include a wide variety of other libraries 1338 to provide many functions for applications 1320 and other software modules.

The frameworks 1318 (also sometimes referred to as middleware) provide a higher-level common infrastructure that may be used by the applications 1320 and/or other software modules. For example, the frameworks 1318 may provide various graphic user interface (GUI) functions, high-level resource management, or high-level location services. The frameworks 1318 may provide a broad spectrum of other APIs for applications 1320 and/or other software modules.

The applications 1320 include built-in applications 1320 and/or third-party applications 1322. Examples of built-in applications 1320 may include, but are not limited to, a contacts application, a browser application, a location application, a media application, a messaging application, and/or a game application. Third-party applications 1322 may include any applications developed by an entity other than the vendor of the particular platform. The applications 1320 may use functions available via OS 1314, libraries 1316, frameworks 1318, and presentation layer 1324 to create user interfaces to interact with users.

Some software architectures use virtual machines, as illustrated by a virtual machine 1328. The virtual machine 1328 provides an execution environment where applications/modules can execute as if they were executing on a hardware machine (such as the machine 1400 of FIG. 14, for example). The virtual machine 1328 may be hosted by a host OS (for example, OS 1314) or hypervisor, and may have a virtual machine monitor 1326 which manages operation of the virtual machine 1328 and interoperation with the host operating system. A software architecture, which may be different from software architecture 1302 outside of the virtual machine, executes within the virtual machine 1328 such as an OS 1350, libraries 1352, frameworks 1354, applications 1356, and/or a presentation layer 1358.

Figure 14:
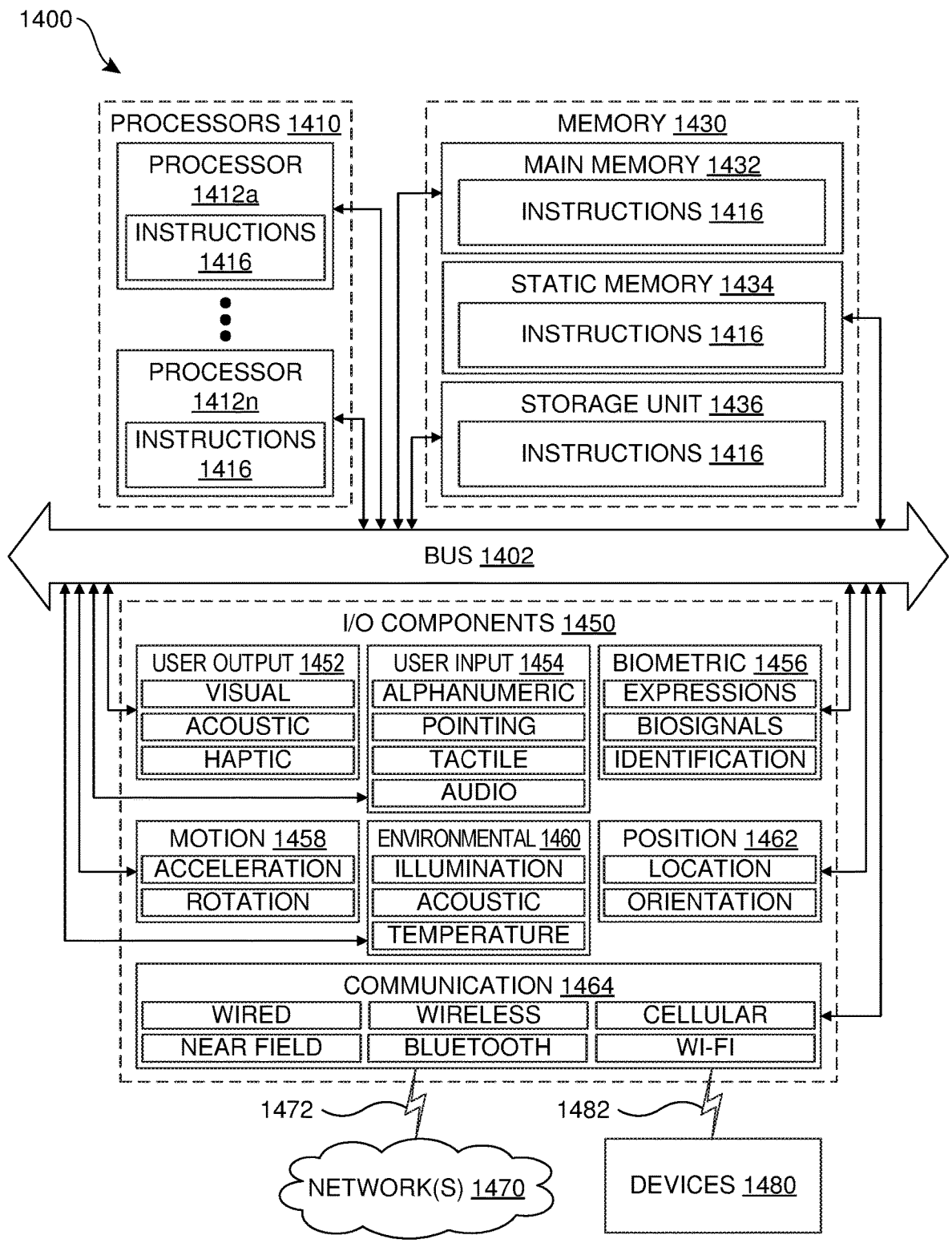
FIG. 14 is a block diagram illustrating components of an example machine configured to read instructions from a machine-readable medium and perform any of the described features.

FIG. 14 is a block diagram illustrating components of an example machine 1400 configured to read instructions from a machine-readable medium (for example, a machine-readable storage medium) and perform any of the features described herein. The example machine 1400 is in a form of a computer system, within which instructions 1416 (for example, in the form of software components) for causing the machine 1400 to perform any of the features described herein may be executed. As such, the instructions 1416 may be used to implement modules or components described herein. The instructions 1416 cause unprogrammed and/or unconfigured machine 1400 to operate as a particular machine configured to carry out the described features. The machine 1400 may be configured to operate as a standalone device or may be coupled (for example, networked) to other machines. In a networked deployment, the machine 1400 may operate in the capacity of a server machine or a client machine in a server-client network environment, or as a node in a peer-to-peer or distributed network environment. Machine 1400 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1400 is illustrated, the term "machine" include a collection of machines that individually or jointly execute the instructions 1416.

The machine 1400 may include processors 1410, memory 1430, and I/O components 1450, which may be communicatively coupled via, for example, a bus 1402. The bus 1402 may include multiple buses coupling various elements of machine 1400 via various bus technologies and protocols. In an example, the processors 1410 (including, for example, a central processing unit (CPU), a graphics processing unit (GPU), a digital signal processor (DSP), an ASIC, or a suitable combination thereof) may include one or more processors 1412a to 1412n that may execute the instructions 1416 and process data. In some examples, one or more processors 1410 may execute instructions provided or identified by one or more other processors 1410. The term "processor" includes a multi-core processor including cores that may execute instructions contemporaneously. Although FIG. 14 shows multiple processors, the machine 1400 may include a single processor with a single core, a single processor with multiple cores (for example, a multi-core processor), multiple processors each with a single core, multiple processors each with multiple cores, or any combination thereof. In some examples, the machine 1400 may include multiple processors distributed among multiple machines.

The memory/storage 1430 may include a main memory 1432, a static memory 1434, or other memory, and a storage unit 1436, both accessible to the processors 1410 such as via the bus 1402. The storage unit 1436 and memory 1432, 1434 store instructions 1416 embodying any one or more of the functions described herein. The memory/storage 1430 may also store temporary, intermediate, and/or long-term data for processors 1410. The instructions 1416 may also reside, completely or partially, within the memory 1432, 1434, within the storage unit 1436, within at least one of the processors 1410 (for example, within a command buffer or cache memory), within at least one of I/O components 1450, or any suitable combination thereof, during execution thereof. Accordingly, the memory 1432, 1434, the storage unit 1436, memory in processors 1410, and memory in I/O components 1450 are examples of machine-readable media.

As used herein, "machine-readable medium" refers to a device able to temporarily or permanently store instructions and data that cause machine 1400 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 1416) for execution by a machine 1400 such that the instructions, when executed by one or more processors 1410 of the machine 1400, cause the machine 1400 to perform and one or more of the features described herein. Accordingly, a "machine-readable medium" may refer to a single storage device, as well as "cloud-based" storage systems or storage networks that include multiple storage apparatus or devices.

The I/O components 1450 may include a wide variety of hardware components adapted to receive input, provide output, produce output, transmit information, exchange information, capture measurements, and so on. The specific I/O components 1450 included in a particular machine will depend on the type and/or function of the machine. For example, mobile devices such as mobile phones may include a touch input device, whereas a headless server or IoT device may not include such a touch input device. The particular examples of I/O components illustrated in FIG. 14 are in no way limiting, and other types of components may be included in machine 1400. The grouping of I/O components 1450 are merely for simplifying this discussion, and the grouping is in no way limiting. In various examples, the I/O components 1450 may include user output components 1452 and user input components 1454. User output components 1452 may include, for example, display components for displaying information (for example, a liquid crystal display (LCD) or a projector), acoustic components (for example, speakers), haptic components (for example, a vibratory motor or force-feedback device), and/or other signal generators. User input components 1454 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1450 may include biometric components 1456 and/or position components 1462, among a wide array of other environmental sensor components. The biometric components 1456 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 1462 may include, for example, location sensors (for example, a Global Position System (GPS) receiver), altitude sensors (for example, an air pressure sensor from which altitude may be derived), and/or orientation sensors (for example, magnetometers).

The I/O components 1450 may include communication components 1464, implementing a wide variety of technologies operable to couple the machine 1400 to network(s) 1470 and/or device(s) 1480 via respective communicative couplings 1472 and 1482. The communication components 1464 may include one or more network interface components or other suitable devices to interface with the network(s) 1470. The communication components 1464 may include, for example, components adapted to provide wired communication, wireless communication, cellular communication, Near Field Communication (NFC), Bluetooth communication, Wi-Fi, and/or communication via other modalities. The device(s) 1480 may include other machines or various peripheral devices (for example, coupled via USB).

In some examples, the communication components 1464 may detect identifiers or include components adapted to detect identifiers. For example, the communication components 1464 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1462, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A telecommunication system comprising:
a single geostationary earth orbiting satellite including:
a first optical communication system configured to receive forward-direction user data via a forward optical link, and
a first radio frequency (RF) communication system configured to transmit, via a plurality of RF spot beams, the forward-direction user data received via the forward optical link;
a single stratospheric high-altitude communication device including:
a second RF communication system configured to receive the forward-direction user data via a plurality of concurrent forward RF feeder links, and
a second optical communication system configured to transmit via the forward optical link the forward-direction user data received via the plurality of forward RF feeder links; and
a ground-based feeder RF terminal (RFT) array including a plurality of ground-based feeder RF terminals (RFTs) configured to transmit a respective one of the plurality of forward RF feeder links and positioned at a same RF feeder site,
wherein a substantial portion of forward feeder data throughput for all forward RF service link transmissions by the satellite is carried via the forward optical link and the plurality of forward RF feeder links.

2. The telecommunication system of claim 1, further comprising a data center configured to, for each feeder RFT of the feeder RFTs:
receive a respective portion of the forward-direction user data as network data for delivery to the satellite;
encode the network data in a first forward RF feeder link signal; and
transmit the first forward RF feeder link signal to the high-altitude communication device as a respective one of the plurality of forward RF feeder links via the feeder RFT.

3. The telecommunication system of claim 1, wherein:
the plurality of RF spot beams includes a first RF spot beam and a second RF spot beam; and
the geostationary earth orbiting satellite is configured to:
demultiplex the received forward optical link into a plurality of optical channel signals with different wavelengths, the plurality of optical channel signals including a first optical channel signal,
obtain a first intermediate forward RF signal by an optical to electrical conversion of the first optical channel signal,
demultiplex the first intermediate forward RF signal into a plurality of RF subband signals, the plurality of RF subband signals including a first RF subband signal and a second RF subband signal,
generate a first forward RF service link signal by upconverting and amplifying the first RF subband signal,
transmit the first forward RF service link signal via the first RF spot beam,
generate a second RF service link signal by upconverting and amplifying the second RF subband signal, and
transmit the second RF service link signal via the second RF spot beam.

4. The telecommunication system of claim 3, wherein:
the plurality of forward RF feeder links includes a first forward RF feeder link and a second forward RF feeder link; and
the high-altitude communication device is configured to:
downconvert the first forward RF feeder link to a lower RF band to obtain a first downconverted RF signal,
downconvert the second forward RF feeder link to a lower RF band to obtain a second downconverted RF signal,
modulate the first downconverted RF signal onto a first laser beam with a first optical wavelength,
modulate the second downconverted RF signal onto a second laser beam with a second optical wavelength that is different than the first optical wavelength, and
multiplex the modulated first laser beam and the modulated second laser beam into the forward optical link.

5. The telecommunication system of claim 1, wherein:
the first RF communication system is further configured to receive reverse-direction user data via a plurality of reverse RF service links including a first reverse RF service link received via a first RF spot beam and a second RF service link received via a second RF spot beam;
the first optical communication system is further configured to transmit via a reverse optical link the reverse-direction user data received via the plurality of reverse RF service links;
the second optical communication system is further configured to receive the reverse-direction user data via the reverse optical link; and
the second RF communication system is further adapted to transmit, via a plurality of reverse RF feeder links to the feeder RFT array, the reverse-direction user data received via the reverse optical link.

6. The telecommunication system of claim 5, further comprising a data center configured to, for each feeder RFT of the feeder RFTs:
receive a respective first reverse RF feeder link included in the plurality of reverse RF feeder links;
decode a respective first portion of the reverse-direction user data from the received first reverse RF feeder link; and
transmit the first portion of the reverse-direction user data as network data received via the satellite.

7. The telecommunication system of claim 5, wherein the satellite is configured to:
multiplex the first and second reverse RF service links in respective subbands of an intermediate reverse RF feeder link signal;
modulate the intermediate reverse RF feeder link signal onto a first laser beam with a first optical wavelength; and
multiplex the modulated first laser beam into the reverse optical link.

8. The telecommunication system of claim 5, wherein the satellite is further configured to:

multiplex the first and second reverse RF service links in respective subbands of an intermediate reverse RF feeder link signal;

modulate the intermediate reverse RF feeder link signal onto a first laser beam with a first optical wavelength; and multiplex the modulated first laser beam into the reverse optical link.

9. The telecommunication system of claim 7, wherein:

the plurality of reverse RF feeder links includes a first reverse RF feeder link and a second reverse RF feeder link; and the high-altitude communication device is configured to:
  demultiplex the received reverse optical link into a plurality of optical channel signals with different wavelengths, the plurality of optical channel signals including a first optical channel signal and a second optical channel signal,
  obtain a first reverse RF signal by an optical to electrical conversion of the first optical channel signal,
  obtain a second reverse RF signal by an optical to electrical conversion of the second optical channel signal,
  generate the first reverse RF feeder link by upconverting and amplifying the first reverse RF signal, and
  generate the second reverse RF feeder link signal by upconverting and amplifying the second reverse RF signal.

10. The telecommunication system of claim 8, wherein:

the plurality of forward RF feeder links includes a first forward RF feeder link and a second forward RF feeder link;

the plurality of reverse RF feeder links includes a first reverse RF feeder link and a second reverse RF feeder link; and the high-altitude communication device is configured to:
  downconvert the first forward RF feeder link to a lower RF band to obtain a first downconverted RF signal,
  downconvert the second forward RF feeder link to a lower RF band to obtain a second downconverted RF signal,
  modulate the first downconverted RF signal onto a first laser beam with a first optical wavelength,
  modulate the second downconverted RF signal onto a second laser beam with a second optical wavelength that is different than the first optical wavelength,
  multiplex the modulated first laser beam and the modulated second laser beam into the forward optical link,
  demultiplex the received reverse optical link into a plurality of optical channel signals with different wavelengths, the plurality of optical channel signals including a first optical channel signal and a second optical channel signal,
  obtain a first reverse RF signal by an optical to electrical conversion of the first optical channel signal,
  obtain a second reverse RF signal by an optical to electrical conversion of the second optical channel signal,
  generate the first reverse RF feeder link by upconverting and amplifying the first reverse RF signal, and
  generate the second reverse RF feeder link signal by upconverting and amplifying the second reverse RF signal.

11. The telecommunication system of claim 1, wherein the plurality of ground-based feeder RFTs are all positioned within a diameter of less than 1800 meters.

12. The telecommunication system of claim 11, wherein the plurality of ground-based feeder RFTs are all positioned within a diameter of less than 800 meters.

13. The telecommunication system of claim 11, wherein the plurality of ground-based feeder RFTs includes at least 40 ground-based feeder RFTs.

14. The telecommunication system of claim 1, wherein the forward optical link has a total data throughput of at least 1 terabit per second.

15. The telecommunication system of claim 1, wherein the stratospheric high-altitude communication device further includes:

a plurality of sensors; and a pointing, acquisition, and tracking (PAT) controller configured to perform, based on at least sensor data obtained from the sensors, optical pointing of the forward optical link signal between the stratospheric high-altitude communication device and the satellite.

16. A method of data transmission, the method comprising:

receiving, at a geostationary earth orbiting satellite, forward-direction user data via a forward optical link;

transmitting, by the geostationary earth orbiting satellite via a plurality of radio frequency (RF) spot beams, the forward-direction user data received via the forward optical link;

receiving, at a stratospheric high-altitude communication device, forward-direction user data via a plurality of concurrent forward RF feeder links;

transmitting, by the stratospheric high-altitude communication device via the forward optical link, the forward-direction user data received via the plurality of forward RF feeder links;

transmitting, by each of a plurality of ground-based feeder RF terminals (RFTs) of an RFT array at a same RF feeder site, a respective one of the plurality of forward RF feeder links, wherein a substantial portion of forward feeder data throughput for all forward RF service link transmissions by the satellite is carried via the forward optical link and the plurality of forward RF feeder links.

17. The method of claim 16, further comprising:

receiving, at the geostationary earth orbiting satellite, reverse-direction user data via a plurality of reverse RF service links including a first reverse RF service link received via a first RF spot beam and a second RF service link received via a second RF spot beam;

transmitting, by the geostationary earth orbiting satellite via a reverse optical link, the reverse-direction user data received via the plurality of reverse RF service links;

receiving, at the stratospheric high-altitude communication device, the reverse-direction user data via the reverse optical link; and transmitting, by the stratospheric high-altitude communication device via a plurality of reverse RF feeder links to the feeder RFT array, the reverse-direction user data received via the reverse optical link.

18. The method of claim 16, wherein:

the plurality of RF spot beams includes a first RF spot beam and a second RF spot beam; and the method further comprises:
  demultiplexing the received forward optical link into a plurality of optical channel signals with different wavelengths, the plurality of optical channel signals including a first optical channel signal, obtaining a first intermediate forward RF signal by an optical to electrical conversion of the first optical channel signal, demultiplexing the first intermediate forward RF signal into a plurality of RF subband signals, the plurality of RF subband signals including a first RF subband signal and a second RF subband signal, generating a first forward RF service link signal by upconverting and amplifying the first RF subband signal, transmitting the first forward RF service link signal via the first RF spot beam, generating a second RF service downlink signal by upconverting and amplifying the second RF subband signal, and transmitting the second RF service downlink signal via the second RF spot beam.

19. The method of claim 16, wherein the plurality of ground-based feeder RFTs are all positioned within a diameter of less than 1800 meters.

20. The method of claim 19, wherein the plurality of ground-based feeder RFTs includes at least 40 ground-based feeder RFTs.

21. The telecommunication system of claim 1, wherein the substantial portion of the forward feeder data throughput comprises at least 95% of the forward feeder data throughput.

22. The method of claim 16, wherein the substantial portion of the forward feeder data throughput comprises at least 95% of the forward feeder data throughput.

23. A telecommunication system comprising:

a single geostationary earth orbiting satellite including:
- a first optical communication system configured to receive forward-direction user data via a forward optical link, and
- a first radio frequency (RF) communication system configured to transmit, via a plurality of RF spot beams, the forward-direction user data received via the forward optical link;

a single stratospheric high-altitude communication device including:
- a second RF communication system configured to receive the forward-direction user data via a plurality of concurrent forward RF feeder links, and
- a second optical communication system configured to transmit via the forward optical link the forward-direction user data received via the plurality of forward RF feeder links; and a ground-based feeder RF terminal (RFT) array including a plurality of ground-based feeder RF terminals (RFTs) configured to transmit a respective one of the plurality of forward RF feeder links and positioned at a same RF feeder site, wherein at least 95% of forward feeder data throughput for all forward RF service link transmissions by the satellite is carried via the forward optical link and the plurality of forward RF feeder links.

* * * * *

UNITED STATES PATENT AND TRADEMARK OFFICE
CERTIFICATE OF CORRECTION

PATENT NO. : 10,727,949 B2  
APPLICATION NO. : 16/237358  
DATED : July 28, 2020  
INVENTOR(S) : Stanley Edward Kay et al.

Page 1 of 1

It is certified that error appears in the above-identified patent and that said Letters Patent is hereby corrected as shown below:

In the Claims

Column 37, Line 13 "generating a second RF service downlink signal by" should be -- generating a second RF service link signal by --;

Column 37, Line 16 "transmitting the second RF service downlink signal via" should be -- transmitting the second RF service link signal via --.

Signed and Sealed this  
Twentieth Day of October, 2020

Andrei Iancu  
*Director of the United States Patent and Trademark Office*